US011863977B2

(12) United States Patent
Lei et al.

(10) Patent No.: US 11,863,977 B2
(45) Date of Patent: Jan. 2, 2024

(54) KEY GENERATION METHOD, DEVICE, AND SYSTEM

(71) Applicant: HUAWEI TECHNOLOGIES CO., LTD., Shenzhen (CN)

(72) Inventors: Zhongding Lei, Singapore (SG); Haiguang Wang, Singapore (SG); Xin Kang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 17/243,011

(22) Filed: Apr. 28, 2021

(65) Prior Publication Data

US 2021/0250762 A1 Aug. 12, 2021

Related U.S. Application Data

(63) Continuation of application No. PCT/CN2018/112730, filed on Oct. 30, 2018.

(51) Int. Cl.
*H04W 12/041* (2021.01)
*H04W 12/033* (2021.01)

(52) U.S. Cl.
CPC ....... *H04W 12/041* (2021.01); *H04W 12/033* (2021.01)

(58) Field of Classification Search
CPC .. H04W 12/041; H04W 12/033; H04L 63/061
See application file for complete search history.

(56) References Cited

U.S. PATENT DOCUMENTS

| 2010/0111307 | A1* | 5/2010 | Hu | H04L 9/3271 380/277 |
| 2015/0341791 | A1* | 11/2015 | Yang | G06F 21/33 713/159 |
| 2019/0215903 | A1* | 7/2019 | Wu | H04W 12/041 |

(Continued)

FOREIGN PATENT DOCUMENTS

| CN | 101237444 A | 8/2008 |
| CN | 101257723 A | 9/2008 |
| CN | 104519486 A | 4/2015 |

(Continued)

OTHER PUBLICATIONS

Chinese Office Action issued in corresponding Chinese Application No. 201880098520.7, dated Apr. 15, 2022, pp. 1-8.

(Continued)

*Primary Examiner* — Carl G Colin
*Assistant Examiner* — Andrew Suh
(74) *Attorney, Agent, or Firm* — HAUPTMAN HAM, LLP

(57) ABSTRACT

A key generation method includes a user plane network function and a terminal device obtain key update information sent by each other. The user plane network function updates, by using the obtained key update information, a sub-key derived from a permanent key, to obtain a new protection key. The terminal device updates, by using the obtained key update information, a sub-key derived from the permanent key, to obtain a new protection key. The terminal device and the user plane network function perform, by using the new protection key, security protection on user plane data transmitted between the terminal device and the user plane network function.

20 Claims, 5 Drawing Sheets

(56) References Cited

U.S. PATENT DOCUMENTS

2021/0400474 A1* 12/2021 Stauffer .................. H04L 9/50

FOREIGN PATENT DOCUMENTS

| | | | |
|---|---|---|---|
| CN | 104936173 | A | 9/2015 |
| CN | 106375989 | A | 2/2017 |
| CN | 107820283 | A | 3/2018 |
| CN | 108235300 | A | 6/2018 |
| CN | 108347420 | A | 7/2018 |
| WO | 2018194971 | A1 | 10/2018 |

OTHER PUBLICATIONS

3GPP TSG SA WG3 (Security) Meeting #86Bis,S3-170834,pCR: Solution for UE-UPF security setup, Qualcomm Incorporated,Mar. 20, 2017,total 6 pages.

Chinese Office Action issued in corresponding Chinese Application No. 201880098520.7, dated Sep. 28, 2021, pp. 1-9.

Nokia, Evolution scenario for AMF and SEAF from 5G phase 1 to later phases. 3GPP TSG SA WG3 (Security) Meeting #86Bis, Mar. 27-31, 2017, Busan, Korea, S3-170636, 3 pages.

3GPP TR 33.899 V1.3.0 (Aug. 2017), 3rd Generation Partnership Project; Technical Specification Group Services and System Aspects; Study on the security aspects of the next generation system(Release 14), 604 pages.

Extended European Search Report issued in corresponding European Application No. 18938506.5, dated Aug. 20, 2021, pp. 1-7.

International Search Report issued in corresponding International Application No. PCT/CN2018/112730, dated Jul. 18, 2019, pp. 1-9.

Chinese Notice of Allowance issued in corresponding Chinese Application No. 201880098520.7, dated Sep. 27, 2022, pp. 1-4.

* cited by examiner

KEY GENERATION METHOD, DEVICE, AND SYSTEM

CROSS-REFERENCE TO RELATED APPLICATIONS

This application is a continuation of International Application No. PCT/CN2018/112730, filed on Oct. 30, 2018, the disclosure of which is hereby incorporated by reference in its entirety.

TECHNICAL FIELD

Embodiments of this application relate to the field of communications technologies, and in particular, to a key generation method, a device, and a system.

BACKGROUND

In an existing mobile communications security architecture, user plane data transmitted between a terminal device and a telecommunications network may be security-protected. A security protection anchor on a network side is an access network device (for example, a base station). The terminal device and the access network device perform security protection (for example, confidentiality protection and/or integrity protection) on the user plane data. For example, for user plane data to be sent to the network, the terminal device performs a security protection operation (for example, encryption and/or integrity protection verification code appending) by using a protection key. After receiving the protected data, the access network device performs a corresponding security-related operation (for example, decryption and/or integrity verification) by using the protection key. For user plane data to be sent to the terminal, the access network device performs a security protection operation (for example, encryption and/or integrity protection verification code appending) by using a protection key. After receiving the protected data, the terminal performs a corresponding security-related operation (for example, decryption and/or integrity verification) by using the protection key.

Currently, the protection key is usually derived from a permanent key K by a core network function (an access and mobility management function (AMF), a security anchor function (SEAF), or the like). For example, $K_{AUSF}$ may be derived from the permanent key K, $K_{SEAF}$ may be derived from $K_{AUSF}$, $K_{AMF}$ may be derived from $K_{SEAF}$, and a protection key $K_{gNB}$ may be derived from $K_{AMF}$. If an insider of the AMF has permission to obtain the key $K_{AMF}$ of the AMF, the insider of the AMF may derive the protection key $K_{gNB}$ of the access network device from the key $K_{AMF}$, and decrypt, by using the protection key $K_gNB$, encrypted data that is eavesdropped on over an air interface. Similarly, if a key of another network function (the access network device, the SEAF, or the like) is stolen, a data leakage is also caused.

It can be learned from the foregoing that when existing security protection is performed on the access network device, if the protection key is stolen or leaked, a data leakage is caused, and security of user plane data transmission is reduced.

SUMMARY

Embodiments of this application provide a key generation method, a device, and a system, to reduce a risk of a data leakage caused by a theft or a leakage of a permanent key or an attack from an insider of a network.

To achieve the foregoing objective, the following technical solutions are used in some embodiments of this application:

According to a first aspect, at least one embodiment of this application provides a key generation method. The method includes: A terminal device receives first key update information sent by a user plane network function. The terminal device generates a second key based on a first key and the first key update information. The second key is used to perform security protection on data transmitted between the user plane network function and the terminal device; the first key is the same as a third key obtained by the user plane network function; and the first key and the third key are derived from a permanent key.

According to the key generation method provided in the first aspect, the terminal device may update the key derived from the permanent key, to obtain a new protection key; and then perform security protection on the user plane data by using the new protection key. Because the new protection key is obtained based on the key update information exchanged between the terminal device and the user plane network function and the key derived from the permanent key, an insider of a network function such as an access network device, an AMF, or an SEAF has no permission to obtain the new protection key from the terminal device, or cannot derive the new protection key only from the permanent key, and consequently, cannot decrypt, based on the new protection key, encrypted data that is eavesdropped on. In addition, even if the permanent key is stolen, an attacker cannot derive the new protection key from the permanent key, and cannot decrypt encrypted data that is eavesdropped on over an air interface or in a network. In this way, if security protection is performed on the user plane data by using the new protection key generated in at least one embodiment of this application, the user plane data is not likely to be leaked, thereby improving data transmission security.

In a possible design, the first key is generated by the terminal device based on a first group of generation parameters, where the first group of generation parameters includes the permanent key or a sub-key derived from the permanent key, and the first group of generation parameters is sent by a mobility management network function or a security anchor function network function to the terminal device. According to the possible design, the terminal device may generate the first key by using a generation parameter sent by another network function.

In a possible design, the method further includes: The terminal device receives a first indication from the user plane network function, where the first indication is used to indicate the terminal device to update the first key; or the terminal device sends a second indication to the user plane network function, where the second indication is used to indicate the user plane network function to update the third key.

The first indication or the second indication includes one or more of the following information: a key update indicator, a predefined Internet protocol IP address, a predefined port number, or a predefined virtual protocol identifier ID; or the first indication is an $N^{th}$ message sent by the user plane network function to the terminal device; or the second indication is an $N^{th}$ message sent by the terminal device to the user plane network function, where $N^{th}$ is an integer greater than or equal to 1.

According to the possible design, the user plane network function may send the key update indicator or predefined information to the terminal device, to indicate the terminal device to generate the new protection key in a key generation manner described in at least one embodiment of this application. Alternatively, the terminal device is indicated in advance to update the key when the terminal device receives the $N^{th}$ message sent by the user plane network function. In this way, when the terminal device receives the $N^{th}$ message sent by the user plane network function, the terminal device determines to generate the new protection key in a key generation manner described in at least one embodiment of this application. Similarly, the terminal device may also send the key update indicator or predefined information to the user plane network function, to indicate the user plane network function to generate the new protection key in the key generation manner described in at least one embodiment of this application. Alternatively, the user plane network function is indicated in advance to update the key when the user plane network function receives the $N^{th}$ message sent by the terminal device. In this way, when the user plane network function receives the $N^{th}$ message sent by the terminal device, the user plane network function determines to generate the new protection key in the key generation manner described in at least one embodiment of this application.

In a possible design, the method further includes: The terminal device receives a third indication from a session management network function, where the third indication is used to indicate the terminal device to update the first key.

According to the possible design, the terminal device may perform the key generation method according to the first aspect after receiving the indication delivered by the session management network function. The session management network function sends the third indication to the terminal device only after determining to perform security protection on the user plane network function. That the session management network function determines to perform security protection on the user plane network function includes: The session management network function determines, based on a security protection policy, to perform security protection on the user plane network function, where the security protection policy includes information about the user plane network function on which security protection is to be performed, and the security protection policy is prestored in the session management network function, or the security protection policy is obtained by the session management network function from a unified data management network function. That is, the session management network function may determine, based on locally stored information, whether to perform security protection on the user plane network function, or learn, by using the unified data management network function, whether to perform security protection on the user plane network function.

In a possible design, the first key update message is sent by the user plane network function after being protected by using the third key. That the terminal device obtains the first key update information sent by the user plane network function includes: The terminal device receives the protected first key update information; and the terminal device processes the protected first key update information by using the first key, to obtain the first key update information.

According to the possible design, the first key update information can be protected in a process of sending the first key update information to the terminal device, to prevent the first key update information from being stolen or tampered with by a malicious person.

In a possible design, the method further includes: The terminal device sends second key update information to the user plane network function, where the second key update information is used to update the third key obtained by the user plane network function, to obtain a fourth key; the fourth key is used to perform security protection on the data transmitted between the user plane network function and the terminal device; and the fourth key is the same as the second key.

According to the possible design, the terminal device may send, to the user plane network function, the key update information used to update the third key, so that the user plane network function updates the third key based on the received key update information.

In a possible design, the second key update information is included in a first message, and the first message is control signaling or a data packet. The first message is an $N^{th}$ message sent by the terminal device to the user plane network function; or the first message includes the second indication. The second indication is described above.

According to the possible design, the terminal device may send the second key update information to the user plane network function through a control plane or a data plane. In addition, the terminal device may include the second indication in a message including the second key update information, to explicitly indicate, by using the second indication, the user plane network function to update the third key. Alternatively, the user plane network function may be implicitly indicated, by using the $N^{th}$ message sent by the terminal device to the user plane network function, to update the third key. For example, when the user plane function network function receives the $N^{th}$ message sent by the terminal device, the user plane function network function determines to update the third key, to generate the new protection key.

In a possible design, the first key update information or the second key update information includes one or more of a random number, a public key, an IP address, a media access control MAC address, a port number, a virtual protocol identification number, a key generation function, or key generation function selection information.

In a possible design, that the terminal device generates the second key based on the first key and the first key update information includes: The terminal device inputs the first key and a part or all of information in the first key update information into a key generation function, to obtain the second key.

According to the possible design, the terminal device may update the first key based on the first key update information and other information, to obtain the new protection key.

According to a second aspect, this application provides a communications apparatus. The communications apparatus may be a terminal device or a chip or a system-on-a-chip in a terminal device. The communications apparatus may implement a function performed by the terminal device according to the first aspect or the possible designs of the first aspect. The function may be implemented by hardware, or implemented by hardware by executing corresponding software. The hardware or the software includes one or more modules corresponding to the foregoing function. For example, the communications apparatus may include a receiving unit and the generation unit.

The receiving unit is configured to receive first key update information sent by a user plane network function.

The generation unit is configured to generate a second key based on a first key and the first key update information. The second key is used to perform security protection on data transmitted between a user plane network function and the terminal device; the first key is the same as a third key obtained by the user plane network function; and the first key and the third key are derived from a permanent key.

For a specific implementation of the communications apparatus, refer to behavior and a function of the terminal device in the key generation method provided according to any one of the first aspect or the possible designs of the first aspect. Details are not repeated herein again. Therefore, the provided communications apparatus can achieve same beneficial effects as any one of the first aspect or the possible designs of the first aspect.

According to a third aspect, a communications apparatus is provided. The communications apparatus includes a processor and a memory. The memory is configured to store computer-executable instructions. When the communications apparatus runs, the processor executes the computer-executable instructions stored in the memory, to enable the communications apparatus to perform the key generation method according to any one of the first aspect or the possible designs of the first aspect.

According to a fourth aspect, a computer-readable storage medium is provided. The computer-readable storage medium stores instructions. When the instructions are run on a computer, the computer is enabled to perform the key generation method according to any one of the first aspect or the possible designs of the foregoing aspects.

According to a fifth aspect, a computer program product including instructions is provided. When the computer program product runs on a computer, the computer is enabled to perform the key generation method according to any one of the first aspect or the possible designs of the foregoing aspects.

According to a sixth aspect, a chip system is provided. The chip system includes a processor and a communications interface, and is configured to support a communications apparatus in implementing a function in the foregoing aspects. For example, the processor receives, through the communications interface, first key update information sent by a user plane network function; and generates a second key based on a first key and the first key update information. The second key is used to perform security protection on data transmitted between the user plane network function and a terminal device; the first key is the same as a third key obtained by the user plane network function; and the first key and the third key are derived from a permanent key. In a possible design, the chip system further includes a memory, and the memory is configured to store program instructions and data that are necessary for the communications apparatus. The chip system may include a chip, or may include a chip and another discrete component.

For technical effects achieved by any one of the design manners of the third aspect to the sixth aspect, refer to technical effects achieved by any one of the first aspect or the possible designs of the first aspect. Details are not described again.

According to a seventh aspect, at least one embodiment of this application provides a key generation method. The method includes: A user plane network function receives second key update information sent by a terminal device. The user plane network function generates a fourth key based on a third key and the second key update information. The fourth key is used to perform security protection on data transmitted between the user plane network function and the terminal device; the third key is the same as a first key generated by the terminal device; and the first key and the third key are derived from a permanent key.

According to the key generation method provided in the seventh aspect, the user plane network function may update the key derived from the permanent key, to obtain a new protection key; and then perform security protection on the user plane data by using the new protection key. Because the new protection key is obtained based on the key update information exchanged between the terminal device and the user plane network function and the key derived from the permanent key, an insider of a network function such as an access network device, an AMF, or an SEAF has no permission to obtain the new protection key from the user plane network function, or cannot derive the new protection key only from the permanent key, and consequently, cannot decrypt, based on the new protection key, encrypted data that is eavesdropped on. In addition, even if the permanent key is stolen, an attacker cannot derive the new protection key from the permanent key, and cannot decrypt encrypted data that is eavesdropped on over an air interface or encrypted data that is stolen from a network. In this way, if security protection is performed on the user plane data by using the new protection key generated in at least one embodiment of this application, the user plane data is not likely to be leaked, thereby improving data transmission security.

In a possible design, the third key is sent by a mobility management network function, a security anchor network function, or a session management network function to the user plane network function; or the third key is generated by the user plane network function based on a second group of generation parameters, where the second group of generation parameters includes the permanent key or a sub-key derived from the permanent key, and the second group of generation parameters is sent by a mobility management network function, a security anchor function network function, or a session management network function to the user plane network function.

In the possible design, the user plane network function may obtain the first key from another network function, or may generate the third key by using a generation parameter sent by another network function, thereby improving flexibility of obtaining the third key by the user plane network function.

In a possible design, the method further includes: The user plane network function sends a first indication to the terminal device, where the first indication is used to indicate the terminal device to update the first key; or the user plane network function receives a second indication sent by the terminal device, where the second indication is used to indicate the user plane network function to update the third key.

The first indication or the second indication includes one or more of the following information: a key update indicator, a predefined Internet protocol IP address, a predefined port number, or a predefined virtual protocol identifier ID; or the first indication is an $N^{th}$ message sent by the user plane network function to the terminal device; or the second indication is an $N^{th}$ message sent by the terminal device to the user plane network function, where $N^{th}$ is an integer greater than or equal to 1.

According to the possible design, the user plane network function may send the key update indicator or predefined information to the terminal device, to indicate the terminal device to generate the new protection key in a key generation manner described in at least one embodiment of this application. Alternatively, the terminal device is indicated in advance to update the key when the terminal device receives the $N^{th}$ message sent by the user plane network function. In this way, when the terminal device receives the $N^{th}$ message sent by the user plane network function, the terminal device determines to generate the new protection key in a key generation manner described in at least one embodiment of this application. Similarly, the terminal device may also send the key update indicator or predefined information to the user plane network function, to indicate the user plane network function to generate the new protection key in the key generation manner described in at least one embodiment of this application. Alternatively, the user plane network function is indicated in advance to update the key when the user plane network function receives the $N^{th}$ message sent by the terminal device. In this way, when the user plane network function receives the $N^{th}$ message sent by the terminal device, the user plane network function determines to generate the new protection key in the key generation manner described in at least one embodiment of this application.

In a possible design, the method further includes: The user plane network function receives, from the session management network function, a fourth indication used to indicate the user plane network function to update the third key, or the user plane network function receives, from the terminal device, a first request used to request the user plane network function to update the third key.

According to the possible design, the user plane network function may perform the key generation process described in at least one embodiment of this application after receiving the indication of the session management network function or the request sent by the terminal device. The session management network function sends the fourth indication to the user plane network function only after determining to perform security protection on the user plane network function. That the session management network function determines to perform security protection on the user plane network function includes: The session management network function determines, based on a security protection policy, to perform security protection on the user plane network function, where the security protection policy includes information about the user plane network function on which security protection is to be performed, and the security protection policy is prestored in the session management network function, or the security protection policy is obtained by the session management network function from a unified data management network function. That is, the session management network function may determine, based on locally stored information, whether to perform security protection on the user plane network function, or learn, by using the unified data management network function, whether to perform security protection on the user plane network function.

In a possible design, that the user plane network function receives the second key update information sent by the terminal device includes: The user plane network function receives the second key update information from the mobility management network function, where the second key update information is sent by the terminal device to the mobility management network function through a non-access stratum (non-access stratum, NAS) channel.

According to the possible design, the terminal device may send the second key update information to the mobility management network function through the NAS channel, and the mobility management network function sends the second key update information to the user plane network function.

In a possible design, that the user plane network function receives the second key update information sent by the terminal device includes: The user plane network function receives the second key update information from an access network device, where the second key update information is sent by the terminal device to the access network device. The second key update information is included in the first message; and the first message is control signaling sent through a control plane; or the first message is a data packet sent through a data plane.

According to the possible design, the terminal device may send the second key update information to the access network device, and the access network device sends the second key update information to the user plane network function through the control plane or the data plane.

In a possible design, the first message is an $N^{th}$ message sent by the terminal device to the user plane network function; or the first message includes the second indication. The second indication is described above, and may be used to indicate the user plane network function to update the third key.

According to the possible design, the second indication may be included in a message including the second key update information, to explicitly indicate, by using the second indication, the user plane network function to update the third key. Alternatively, the user plane network function may be implicitly indicated, by using the $N^{th}$ message sent by the terminal device to the user plane network function, to update the third key. For example, when the user plane function network function receives the Nth message sent by the terminal device, the user plane function network function determines to update the third key, to generate the new protection key.

In a possible design, the second key update message is sent by the terminal device after being protected by using the first key. That the user plane network function receives the second key update information sent by the terminal device includes: The user plane network function receives the protected second key update information, and processes the protected second key update information by using the third key, to obtain the second key update information.

According to the possible design, the second key update information can be protected in a process of sending the second key update information to the user plane network function, to prevent the second key update information from being eavesdropped on or tampered with by a malicious person.

In a possible design, the first key update information or the second key update information includes one or more of a random number, a public key, an IP address, a media access control (media access control, MAC) address, a port number, a virtual protocol identification number, a key generation function, or key generation function selection information.

In a possible design, that the user plane network function generates the third key based on the third key and the second key update information includes: The user plane network function inputs the third key and a part or all of information in the second key update information into a key generation function, to obtain the third key.

According to the possible design, the user plane network function may update the third key based on the third key and other information, to obtain the new protection key.

According to an eighth aspect, this application provides a communications apparatus. The communications apparatus may be a user plane network function or a chip or a system-on-a-chip in a user plane network function. The communications apparatus may implement a function performed by the user plane network function according to the foregoing aspects or the possible designs. The functions may be implemented by hardware, or implemented by hardware by executing corresponding software. The hardware or the software includes one or more modules corresponding to the foregoing function. For example, the communications apparatus may include a receiving unit and the generation unit.

The receiving unit is configured to receive second key update information sent by a terminal device.

The generation unit is configured to generate a fourth key based on a third key and the second key update information. The fourth key is used to perform security protection on data transmitted between the user plane network function and the terminal device; the third key is the same as a first key generated by the terminal device; and the first key and the third key are derived from a permanent key.

For a specific implementation of the communications apparatus, refer to behavior and a function of the user plane network function in the key generation method provided according to any one of the seventh aspect or the possible designs of the seventh aspect. Details are not repeated herein again. Therefore, the provided communications apparatus can achieve same beneficial effects as any one of the seventh aspect or the possible designs of the seventh aspect.

According to a ninth aspect, a communications apparatus is provided. The communications apparatus includes a processor and a memory. The memory is configured to store computer-executable instructions. When the communications apparatus runs, the processor executes the computer-executable instructions stored in the memory, to enable the communications apparatus to perform the key generation method according to any one of the seventh aspect or the possible designs of the seventh aspect.

According to a tenth aspect, a computer-readable storage medium is provided. The computer-readable storage medium stores instructions. When the instructions are run on a computer, the computer is enabled to perform the key generation method according to any one of the seventh aspect or the possible designs of the foregoing aspects.

According to an eleventh aspect, a computer program product including instructions is provided. When the computer program product runs on a computer, the computer is enabled to perform the key generation method according to any one of the seventh aspect or the possible designs of the foregoing aspects.

According to a twelfth aspect, a chip system is provided. The chip system includes a processor and a communications interface, and is configured to support a communications apparatus in implementing a function in the foregoing aspects. For example, the processor receives, through the communications interface, second key update information sent by a terminal device; and generates a fourth key based on a third key and the second key update information. The fourth key is used to perform security protection on data transmitted between a user plane network function and the terminal device; the third key is the same as a first key generated by the terminal device; and the first key and the third key are derived from a permanent key. In a possible design, the chip system further includes a memory, and the memory is configured to store program instructions and data that are necessary for the communications apparatus. The chip system may include a chip, or may include a chip and another discrete component.

For technical effects achieved by any one of the design manners of the ninth aspect to the twelfth aspect, refer to technical effects achieved by any one of the seventh aspect or the possible designs of the seventh aspect. Details are not described again.

In another feasible solution, a session management network function and the terminal device may exchange key update information, to perform a key update on a control plane key (for example, a key of the session management network function), derive, from an updated control plane key, a key used to perform security protection on user plane data, and then deliver the key to the user plane network function. Specifically, an execution process of the terminal device in the feasible method is described in the following thirteenth aspect to eighteenth aspect, and an execution process of the session management network function is described in a nineteenth aspect to a twenty-fourth aspect.

According to the thirteenth aspect, at least one embodiment of this application further provides a key generation method. The method includes: A terminal device receives third key update information sent by a session management network function. The terminal device generates a new control plane key based on a control plane key and the third key update information, and derives a new protection key from the new control plane key. The new protection key is used to perform security protection on data transmitted between a user plane network function and the terminal device, and the control plane key is derived from a permanent key.

According to the key generation method provided in the thirteenth aspect, the terminal device may update the control plane key derived from the permanent key, to obtain the new control plane key; and then perform security protection on user plane data by using a sub-key derived from the new control plane key. Because the new control plane key is obtained based on the key update information exchanged between the terminal device and the session management network function and the key derived from the permanent key, an insider of a network function such as an access network device, an AMF, or an SEAF has no permission to obtain the new control plane key and the derived sub-key from the terminal device, or cannot derive, only from the permanent key, the sub-key derived from the new control plane key, and consequently, cannot decrypt, based on the sub-key derived from the new control plane key, encrypted data that is eavesdropped on. In addition, even if the permanent key is stolen, an attacker cannot derive, from the permanent key, the sub-key derived from the new control plane key, and cannot decrypt encrypted data that is eavesdropped on over an air interface or in a network. In this way, if security protection is performed on the user plane data by using the new protection key generated in at least one embodiment of this application, the user plane data is not likely to be leaked, thereby improving data transmission security.

In a possible design, the control plane key is generated by the terminal device based on a third group of generation parameters, where the third group of generation parameters includes the permanent key or a sub-key derived from the permanent key, and the third group of generation parameters is sent by a mobility management network function or a security anchor function network function to the terminal device. According to the possible design, the terminal device may generate the control plane key by using a generation parameter sent by another network function.

In a possible design, the method further includes: The terminal device receives indication information from the session management network function, where the indication information is used to indicate the terminal device to update the control plane key.

According to the possible design, the session management network function may send the indication information to the terminal device, to indicate the terminal device to generate the new control plane key in a key generation manner described in the thirteenth aspect.

In a possible design, the third key update message is sent by the session management network function after being protected by using the control plane key. That the terminal device receives the third key update information sent by the session management network function includes: The terminal device receives the protected third key update information; and the terminal device processes the protected third key update information by using the control plane key, to obtain the third key update information.

According to the possible design, the third key update information can be protected in a process of sending the third key update information to the terminal device, to prevent the third key update information from being stolen or tampered with by a malicious person.

In a possible design, the method further includes: The terminal device sends fourth key update information to the session management network function, where the fourth key update information is used to update a control plane key obtained by the session management network function, to obtain a new control plane key; and the new control plane key is used to derive the key for performing security protection on the data transmitted between the user plane network function and the terminal device.

According to the possible design, the terminal device may send, to the session management network function, the key update information used to update the control plane key, so that the session management network function updates the control plane key based on the received key update information.

In a possible design, the third key update information or the fourth key update information includes one or more of a random number, a public key, an IP address, a MAC address, a port number, a virtual protocol identification number, a key generation function, or key generation function selection information.

In a possible design, that the terminal device generates the new control plane key based on the control plane key and the third key update information includes: The terminal device inputs the control plane key and a part or all of information in the third key update information into a key generation function, to obtain the new control plane key.

According to the possible design, the terminal device may update a first key based on the new control plane key, to obtain the new protection key.

According to the fourteenth aspect, this application provides a communications apparatus. The communications apparatus may be a terminal device or a chip or a system-on-a-chip in a terminal device. The communications apparatus may implement a function performed by the terminal device according to the thirteenth aspect or the possible designs of the thirteenth aspect. The function may be implemented by hardware, or implemented by hardware by executing corresponding software. The hardware or the software includes one or more modules corresponding to the foregoing function. For example, the communications apparatus may include a receiving unit and the generation unit.

The receiving unit is configured to receive third key update information sent by a session management network function.

The generation unit is configured to: generate a new control plane key based on a control plane key and the third key update information, and derive a new protection key from the new control plane key. The new protection key is used to perform security protection on data transmitted between a user plane network function and a terminal device, and the control plane key is derived from a permanent key.

For a specific implementation of the communications apparatus, refer to behavior and a function of the terminal device in the key generation method provided according to any one of the thirteenth aspect or the possible designs of the thirteenth aspect. Details are not repeated herein again. Therefore, the provided communications apparatus can achieve same beneficial effects as any one of the thirteenth aspect or the possible designs of the thirteenth aspect.

According to the fifteenth aspect, a communications apparatus is provided. The communications apparatus includes a processor and a memory. The memory is configured to store computer-executable instructions. When the communications apparatus runs, the processor executes the computer-executable instructions stored in the memory, to enable the communications apparatus to perform the key generation method according to any one of the thirteenth aspect or the possible designs of the thirteenth aspect.

According to the sixteenth aspect, a computer-readable storage medium is provided. The computer-readable storage medium stores instructions. When the instructions are run on a computer, the computer is enabled to perform the key generation method according to any one of the thirteenth aspect or the possible designs of the foregoing aspects.

According to the seventeenth aspect, a computer program product including instructions is provided. When the computer program product runs on a computer, the computer is enabled to perform the key generation method according to any one of the thirteenth aspect or the possible designs of the foregoing aspects.

According to the eighteenth aspect, a chip system is provided. The chip system includes a processor and a communications interface, and is configured to support a communications apparatus in implementing a function in the foregoing aspects. For example, the processor receives, through the communications interface, third key update information sent by a session management network function; and generates a new control plane key based on a control plane key and the third key update information, and derives a new protection key from the new control plane key. The new protection key is used to perform security protection on data transmitted between a user plane network function and a terminal device, and the control plane key is derived from a permanent key. In a possible design, the chip system further includes a memory, and the memory is configured to store program instructions and data that are necessary for the communications apparatus. The chip system may include a chip, or may include a chip and another discrete component.

For technical effects achieved by any one of the design manners of the fifteenth aspect to the eighteenth aspect, refer to technical effects achieved by any one of the thirteenth aspect or the possible designs of the thirteenth aspect. Details are not described again.

According to the nineteenth aspect, at least one embodiment of this application further provides a key generation method. The method includes: A session management network function receives fourth key update information sent by a terminal device. The session management network function generates a new control plane key based on a control plane key and the fourth key update information, derives a new protection key from the new control plane key, and sends the new protection key to a user plane network function. The new protection key is used to perform security protection on data transmitted between the user plane network function and the terminal device, and the control plane key is derived from a permanent key.

According to the key generation method provided in the nineteenth aspect, a session management network device may update the control plane key derived from the permanent key, to obtain the new control plane key; and then perform security protection on user plane data by using the protection key derived from the new control plane key, and send the new protection key to the user plane network function. Because the new control plane key is obtained based on the key update information exchanged between the session management network device and the session management network function and the key derived from the permanent key, an insider of a network function such as an access network device, an AMF, or an SEAF has no permission to obtain, from the session management network device, the new control plane key and a sub-key derived from the new control plane key, or cannot derive, only from the permanent key, a sub-key derived from the new control plane key, and consequently, cannot decrypt, based on the sub-key derived from the new control plane key, encrypted data that is eavesdropped on. In addition, even if the permanent key is stolen, an attacker cannot derive, from the permanent key, the sub-key derived from the new control plane key, and cannot decrypt encrypted data that is eavesdropped on over an air interface or in a network. In this way, if security protection is performed on the user plane data by using the new protection key generated in at least one embodiment of this application, the user plane data is not likely to be leaked, thereby improving data transmission security.

In a possible design, the control plane key is obtained by the session management network function from a mobility management network function or a security anchor network function; or is generated by the session management network function based on a fourth group of generation parameters, where the fourth group of generation parameters includes the permanent key or a sub-key derived from the permanent key and another parameter; the permanent key or the sub-key derived from the permanent key in the fourth group of generation parameters is sent by the mobility management network function or the security anchor function network function to the session management network function; and the another parameter may be sent by the mobility management network function or the security anchor function network function to the session management network function, or a part or all of the another parameter is generated by the mobility management function.

In the possible design, the session management network function may obtain the control plane key from the mobility management network function or the security anchor network function, or may generate the control plane key by using a generation parameter sent by another network function, thereby improving flexibility of obtaining the control plane key by the session management network function.

In a possible design, the method further includes: The session management network function sends indication information to the terminal device, where the indication information is used to indicate the terminal device to update the control plane key.

According to the possible design, the session management network function may send the indication information to the terminal device, to indicate the terminal device to generate the new control plane key in a key generation manner described in the thirteenth aspect.

In a possible design, the fourth key update message is sent by the terminal device after being protected by using the control plane key. That the session management network function receives the fourth key update information sent by the terminal device includes: The session management network function receives the protected fourth key update information, and processes the protected fourth key update information by using the control plane key, to obtain the fourth key update information.

According to the possible design, the fourth key update information can be protected in a process of sending the fourth key update information to the session management network function, to prevent the third key update information from being stolen or tampered with by a malicious person.

In a possible design, the method further includes: The session management network function sends third key update information to the terminal device, where the third key update information is used to update a control plane key generated by the terminal device, to obtain a new control plane key; and the new control plane key is used to derive the key for performing security protection on the data transmitted between the user plane network function and the terminal device.

According to the possible design, the session management network function may send, to the terminal device, the key update information used to update the control plane key, so that the terminal device updates the control plane key based on the received key update information.

In a possible design, the third key update information or the fourth key update information includes one or more of a random number, a public key, an IP address, a MAC address, a port number, a virtual protocol identification number, a key generation function, or key generation function selection information.

According to the twentieth aspect, this application provides a communications apparatus. The communications apparatus may be a session management network function or a chip or a system-on-a-chip in a session management network function. The communications apparatus may implement a function performed by the session management network function according to the twentieth aspect or the possible designs of the twentieth aspect. The function may be implemented by hardware, or implemented by hardware by executing corresponding software. The hardware or the software includes one or more modules corresponding to the foregoing function. For example, the communications apparatus may include a determining unit and a sending unit.

A receiving unit is configured to receive fourth key update information sent by a terminal device.

A generation unit is configured to: generate a new control plane key based on a control plane key and the fourth key update information, and derive a new protection key from the new control plane key.

The sending unit is configured to send new protection key to a user plane network function. The new protection key is used to perform security protection on data transmitted between the user plane network function and the terminal device, and the control plane key is derived from a permanent key.

For a specific implementation of the communications apparatus, refer to behavior and a function of the session management network function in the key generation method provided according to any one of the twentieth aspect or the possible designs of the twentieth aspect. Details are not repeated herein again. Therefore, the provided communications apparatus can achieve same beneficial effects as any one of the twentieth aspect or the possible designs of the twentieth aspect.

According to the twenty-first aspect, a communications apparatus is provided. The communications apparatus includes a processor and a memory. The memory is configured to store computer-executable instructions. When the communications apparatus runs, the processor executes the computer-executable instructions stored in the memory, to enable the communications apparatus to perform the key generation method according to any one of the twentieth aspect or the possible designs of the twentieth aspect.

According to the twenty-second aspect, a computer-readable storage medium is provided. The computer-readable storage medium stores instructions. When the instructions are run on a computer, the computer is enabled to perform the key generation method according to any one of the twentieth aspect or the possible designs of the foregoing aspects.

According to the twenty-third aspect, a computer program product including instructions is provided. When the computer program product runs on a computer, the computer is enabled to perform the key generation method according to any one of the twentieth aspect or the possible designs of the foregoing aspects.

According to the twenty-fourth aspect, a chip system is provided. The chip system includes a processor and a communications interface, and is configured to support a communications apparatus in implementing a function in the foregoing aspects. For example, the processor receives, through the communications interface, fourth key update information sent by a terminal device; and generates a new control plane key based on a control plane key and the fourth key update information, derives a new protection key from the new control plane key, and sends the new protection key to a user plane network function through the communications interface. The new protection key is used to perform security protection on data transmitted between the user plane network function and the terminal device, and the control plane key is derived from a permanent key. In a possible design, the chip system further includes a memory, and the memory is configured to store program instructions and data that are necessary for the communications apparatus. The chip system may include a chip, or may include a chip and another discrete component.

For technical effects achieved by any one of the design manners of the twenty-first aspect to the twenty-fourth aspect, refer to technical effects achieved by any one of the twentieth aspect or the possible designs of the twentieth aspect. Details are not described again.

According to a twenty-fifth aspect, a key generation system is provided. The key generation system includes the terminal device according to any one of the second aspect to the sixth aspect, and the user plane network function according to any one of the eighth aspect to the twelfth aspect; or the terminal device according to any one of the thirteenth aspect to the eighteenth aspect, and the session management network function and the user plane network function according to any one of the nineteenth aspect to the twenty-fourth aspect.

It can be learned from the foregoing that some embodiments provide a technical solution specific to a user plane. A security protection anchor is transferred from an access network device to a user plane network function. Security protection on user plane data is performed on a user plane network function, and a protection key used for performing security protection on the user plane network function is generated in the following manner: The user plane network function and a terminal device exchange key update information, to update, based on the key update information, a key derived (derive) (or generated) from a permanent key (permanent key), to obtain the protection key. Because the protection key is obtained by the user plane network function by updating the key derived from the permanent key, an insider of a network function such as an access network device, an AMF, or an SEAF has no permission to obtain the protection key from the user plane network function or derive the protection key from the permanent key, and consequently, cannot eavesdrop on encrypted data based on the protection key. In addition, even if the permanent key is stolen, an attacker cannot derive the protection key from the permanent key, and cannot decrypt encrypted data that is eavesdropped on over an air interface or in a network.

DESCRIPTION OF EMBODIMENTS

The following describes the technical solutions in some embodiments of this application with reference to the accompanying drawings.

Figure 1:
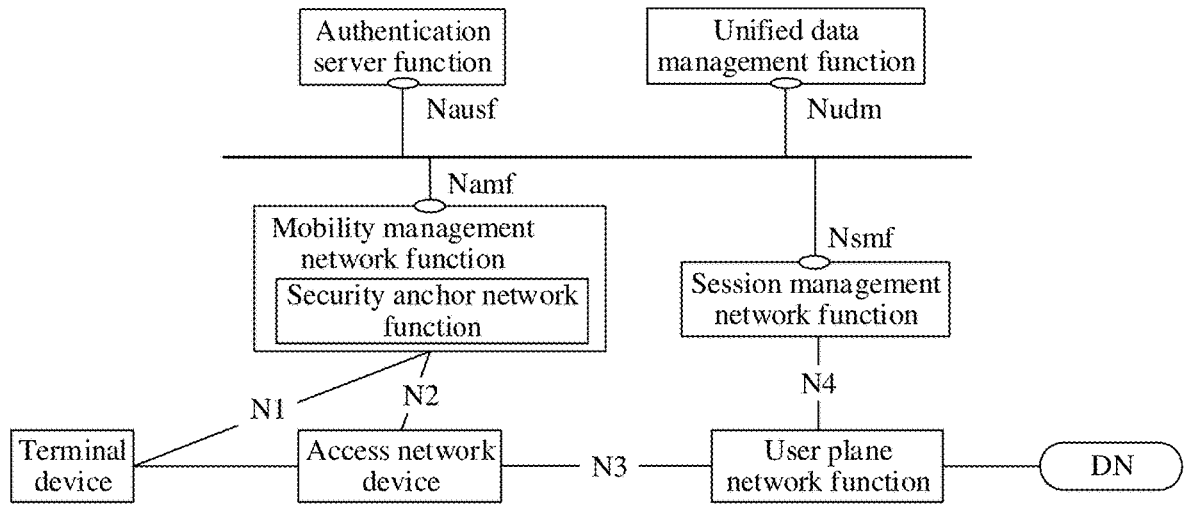
FIG. 1 is a simplified schematic diagram of a system architecture according to at least one embodiment of this application.

A key generation method provided in some embodiments of this application may be applied to a communications system shown in FIG. 1, and is used to generate a key (or a protection key) for performing security protection on user plane data transmitted between a terminal device and a user plane network function. The communications system may be a long term evolution (LTE) system, or may be a 5th generation (5G) system, or may be a new radio (NR) system or another system. As shown in FIG. 1, the communications system may include a terminal device, an access network device, a mobility management network function, a security anchor function, a session management network function, and a user plane network function; and may further include a data network (DN). The network functions may be connected by using a communications interface or a service-oriented interface (such as Nausf, Namf, Nsmf, or Nudm) specified in a protocol. The session management network function and the user plane network function in FIG. 1 may be deployed on a same network slice (NS), and the NS may be leased in a vertical industry. It should be noted that, FIG. 1 is merely a diagram of an example of the architecture. In addition to the functional units shown in FIG. 1, the network architecture may further include a policy control network function, an authentication server function, and another network function. This is not limited in some embodiments of this application.

For example, the terminal device in FIG. 1 may be connected, through a radio air interface, to an access network device deployed by an operator, and may further establish a user plane transmission logical channel with the user plane network function, and access the DN through the user plane transmission logical channel network function. In addition, the terminal device may be connected to the mobility management network function through a next-generation (next generation, N) interface link 1 (an N1 link for short). Specifically, the terminal device may be user equipment (UE), for example, a mobile phone or a computer, or may be a cellular phone, a cordless telephone set, a session initiation protocol (session initiation protocol, SIP) phone, a smartphone, a wireless local loop (WLL) station, a personal digital assistant (PDA), a computer, a laptop computer, a handheld communications device, a handheld computing device, a satellite wireless device, a wireless modem card, a television set-top box (STB), customer premises equipment (CPE), and/or another device configured to perform communication in a wireless system. In addition, the terminal device may alternatively be a device that supports wired access.

For example, the access network device in FIG. 1 is mainly configured to implement functions such as a radio physical layer function, resource scheduling and radio resource management, radio access control, and mobility management. The access network device may be connected to the mobility management network function through an N2 link, and connected to the user plane network function through an N3 link. Specifically, the access network device may be an access network (AN)/a radio access network (RAN), and includes a plurality of 5G-AN/5G-RAN nodes. The 5G-AN/5G-RAN node may be an access point (AP), a next-generation NodeB (gNB), a transmission reception point (TRP), a transmission point (TP), or another access node. In addition, the access network device may alternatively be a device that supports wired access.

The mobility management network function in FIG. 1 is mainly configured to perform mobility management on the terminal device. For example, the mobility management network function in FIG. 1 may be an access and mobility management function (AMF) defined in 3rd generation partnership project (3GPP) standardization.

The security anchor function in FIG. 1 may be connected to an authentication server network function (for example, the authentication server function (AUSF)), and is mainly configured to receive an intermediate key generated in an authentication process. The security anchor function may be deployed in the mobility management network function, as shown in FIG. 1, or may be independently deployed in the system shown in FIG. 1. This is not limited.

The session management network function in FIG. 1 is mainly configured to implement session management functions such as establishment, release, and modification of the user plane transmission logical channel (for example, a protocol data unit (PDU) session). The session management network function may manage one or more user plane network functions. For example, the session management network function may be a session management function (SMF) defined in the 3GPP standardization, and the session management network function may be connected to the user plane network function through an N4 link.

The user plane network function in FIG. 1 may be a user plane function (UPF) defined in a 3GPP standard, and the user plane network function may be used as an anchor on the user plane transmission logical channel, and is mainly configured to: complete routing and forwarding of the user plane data, generate a protection key, perform security protection on the user plane data, and so on. It should be noted that a specific physical location at which the user plane network function is deployed is not limited in some embodiments of this application, and the user plane network function may be deployed in a core network, or may be deployed at a network edge or in a central processing unit (CU) of the access network device (for example, a base station).

In the communications system shown in FIG. 1, the user plane network function may obtain a third key derived from a permanent key or a sub-key of a permanent key, and the terminal device generates a first key derived from the permanent key or the sub-key of the permanent key, where the first key is the same as the third key. The user plane network function and the terminal device obtain key update information sent by each other. The user plane network function updates the third key by using the obtained key update information, to obtain a new protection key. The terminal device updates the first key by using the obtained key update information, to obtain a new protection key. Subsequently, security protection is performed, by using the new protection key or a sub-key derived from the new protection key, on the user plane data transmitted between the terminal device and the user plane network function. Specifically, for the implementation process, refer to descriptions in embodiments corresponding to FIG. 4 and FIG. 5. Alternatively, the session management network function updates a control plane key by using the obtained key update information, and the terminal device updates a control plane key by using the obtained key update information. A key for performing security protection on the user plane data transmitted between the terminal device and the user plane network function is derived from a new control plane key. Specifically, for the implementation process, refer to descriptions in at least one embodiment corresponding to FIG. 6.

It should be noted that the security protection in some embodiments of this application may include the following three manners: (1) confidentiality protection; (2) integrity protection; and (3) confidentiality protection and integrity protection. The confidentiality protection may mean that data is encrypted to achieve an effect of hiding the data, and original data is restored through decryption. The integrity protection may mean that some integrity protection operations are performed on data. For example, whether the data is tampered with may be checked based on a message authentication code (MAC). In addition, names of the network functions and names of the interfaces in the architecture in FIG. 1 are merely examples, and during specific implementation, the names of the network functions and the names of the interfaces may be other names. This is not specifically limited in some embodiments of this application.

During specific implementation, the terminal device, the user plane network function, the session management network function, and the like in FIG. 1 may all be referred to as communications apparatuses, or include a communications apparatus configured to implement the key generation method provided in some embodiments of this application.

Figure 2:
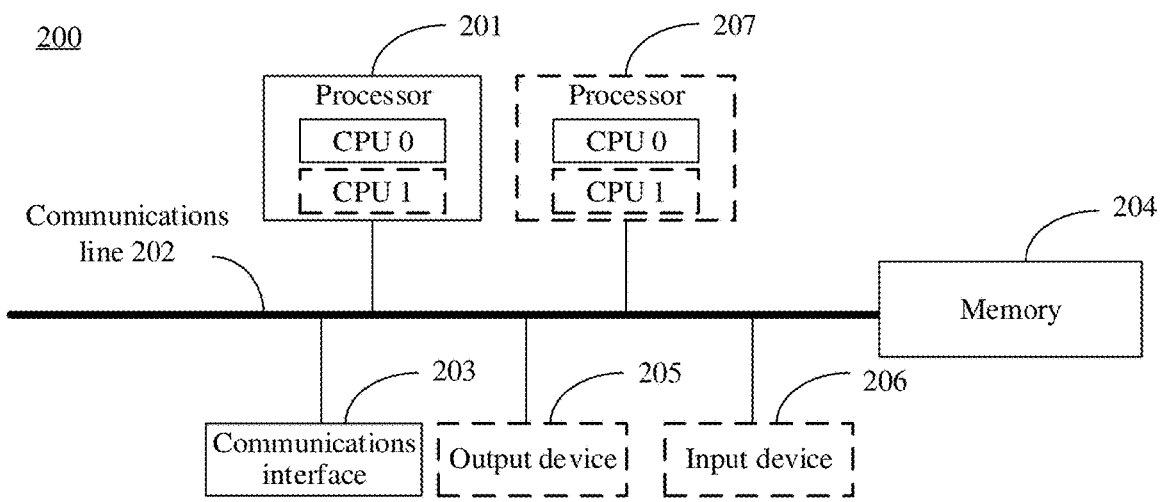
FIG. 2 is a schematic composition diagram of a communications apparatus according to at least one embodiment of this application.

The communications apparatus may include components shown in FIG. 2. FIG. 2 is a schematic composition diagram of a communications apparatus 200 according to at least one embodiment of this application. As shown in FIG. 2, the communications apparatus 200 includes at least one processor 201, a communications line 202, and at least one communications interface 203. Further, the communications apparatus 200 may further include a memory 204. The processor 201, the memory 204, and the communications interface 203 may be connected to each other by using the communications line 202. In some embodiments of this application, "at least one" may be one, two, three, or more. This is not limited in some embodiments of this application.

The processor 201 may be a central processing unit (CPU), a general-purpose processor, a network processor (NP), a digital signal processor (DSP), a microcontroller, a programmable logic device (PLD), or any combination thereof. The processor may alternatively be any other apparatus having a processing function, for example, a circuit, a component, or a software module.

The communications line 202 may include a path, configured to transmit information between the components included in the communications apparatus.

The communications interface 203 is configured to communicate with another device or a communications network (for example, the Ethernet, a radio access network (RAN), or a wireless local area network (WLAN)). The communications interface 203 may be a module, a circuit, a transceiver, or any apparatus that can implement communication.

The memory 204 may be a read-only memory (ROM) or another type of static storage device that can store static information and/or instructions, or a random access memory (RAM) or another type of dynamic storage device that can store information and/or instructions. Alternatively, the memory 204 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that is accessible by a computer. However, the memory 204 is not limited thereto. In a possible design, the memory 204 may be independent of the processor 201. To be specific, the memory 204 may be a memory outside the processor 201. In this case, the memory 204 may be connected to the processor 201 by using the communications line 202, and is configured to store instructions or program code. When invoking and executing the instructions or the program code stored in the memory 204, the processor 201 can implement a key generation method provided in the following embodiments of this application. In another possible design, the memory 204 may alternatively be integrated with the processor 201. To be specific, the memory 204 may be an internal memory of the processor 201. For example, the memory 204 is a cache, and may be configured to temporarily store some data, instruction information, and/or the like.

In a possible implementation, the processor 201 may include one or more CPUs, for example, a CPU 0 and a CPU 1 in FIG. 2. In another possible implementation, the communications apparatus 200 may include a plurality of processors, for example, the processor 201 and a processor 207 in FIG. 2. In still another possible implementation, the communications apparatus 200 may further include an output device 205 and an input device 206. For example, the input device 206 may be a device such as a keyboard, a mouse, a microphone, or a joystick, and the output device 205 may be a device such as a display screen or a speaker.

It should be noted that the communications apparatus 200 may be a general-purpose device or a dedicated device. For example, the communications apparatus 200 may be a desktop computer, a portable computer, a network server, a PDA, a mobile phone, a tablet computer, a wireless terminal device, an embedded device, a chip system, or a device having a structure similar to that in FIG. 2. A type of the communications apparatus 200 is not limited in at least one embodiment of this application. In at least one embodiment of this application, the chip system may include a chip, or may include a chip and another discrete component.

The key generation method provided in some embodiments of this application is described below by using an example in which the communications system shown in FIG. 1 is a 5G system shown in FIG. 3, the user plane network function is a UPF, the access network device is a RAN, the session management network function is an SMF, the mobility management network function is an AMF, the security anchor network function is an SEAF, and the terminal device is UE.

Before the key generation method provided in some embodiments of this application is performed, the UE and a network side have completed two-way authentication, and the UE and a network side device (for example, the AMF, the SEAF, or the RAN) both have generated same keys based on a permanent key or a sub-key derived from a permanent key. The UE and the AMF are used as an example. Both the UE and the AMF have generated a key $K_{AMF}$. The UE and the SEAF are used as an example. Both the UE and the SEAF have generated a key $K_{SEAF}$. Specifically, for processes in which the UE and the network side complete the two-way authentication, and the UE and the network side device generate the keys based on the permanent key or the sub-key derived from the permanent key, refer to the existing technology. Details are not described again. In some embodiments of this application, the permanent key may also be referred to as a root key, different sub-keys may be derived by inputting the permanent key and other parameters into a key generation function, and the sub-key may be referred to as a sub-key derived from the permanent key or a sub-key of the permanent key. Further, a sub-key may be further derived from the sub-key derived from the permanent key. For example, different sub-keys may continue to be derived by inputting the sub-key derived from the permanent key and other parameters into the key generation function. The sub-key derived from the sub-key derived from the permanent key may also be referred to as a sub-key derived from the permanent key or a sub-key of the permanent key. For example, in some embodiments of this application, the key $K_{AMF}$, the key $K_{SEAF}$, a key $K_{RAN}$, and a key $K_{SMF}$ may al be referred to as sub-keys of the permanent key.

Figure 3:
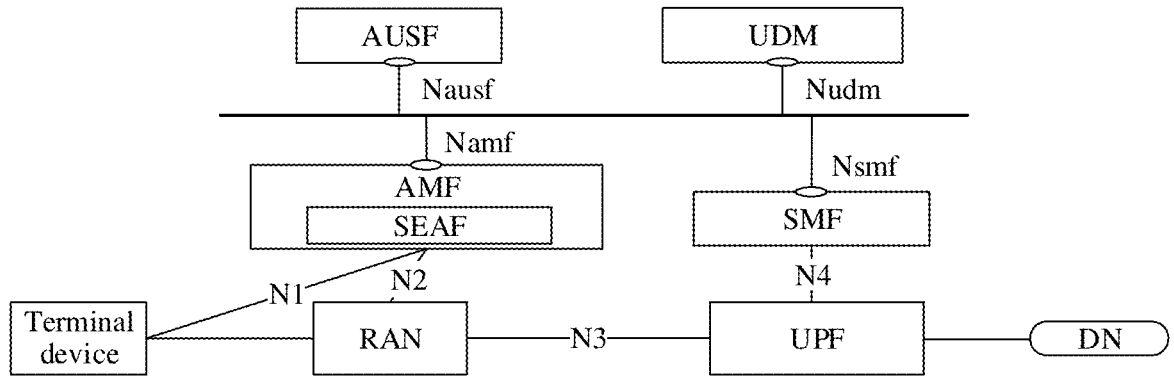
FIG. 3 is a simplified schematic diagram of a 5G system according to at least one embodiment of this application.

It should be noted that the 5G system shown in FIG. 3 is merely an example accompanying drawing. The 5G system may further include another network function, such as unified data management (UDM) or a policy control function (PCF). Each network function mentioned in the following embodiments may have the components shown in FIG. 2, and details are not described again. In addition, in the following embodiments of this application, names of messages between network functions, names of parameters in messages, or the like are merely examples, and there may be other names during specific implementation. This is not specifically limited in some embodiments of this application.

Figure 4:
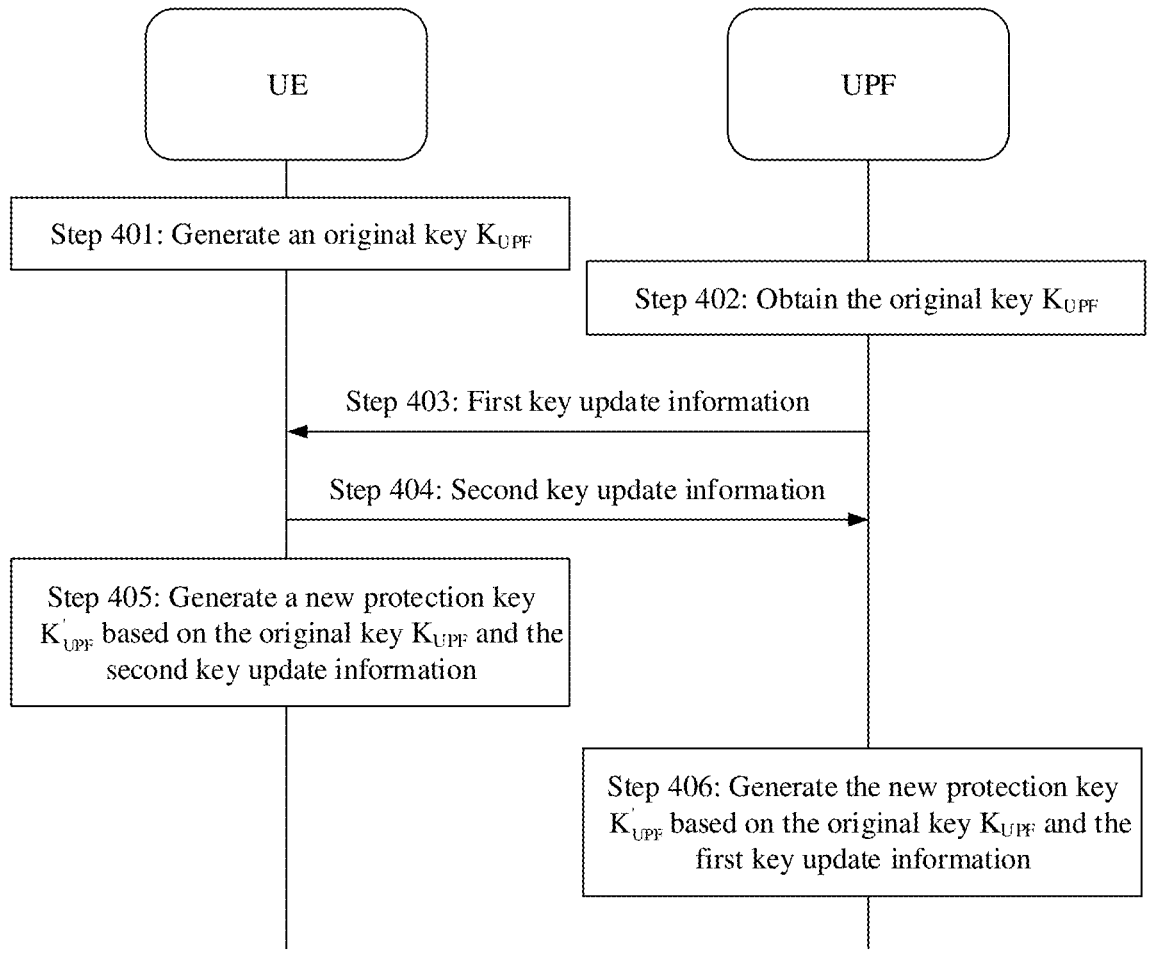
FIG. 4 is a flowchart of a key generation method according to at least one embodiment of this application.

FIG. 4 shows a key generation method according to at least one embodiment of this application. In the method shown in FIG. 4, a first key and a third key are an original key $K_{UPF}$, and a second key and a fourth key are a new protection key $K'_{UPF}$. A UPF and UE may exchange key update information, to update the original key $K_{UPF}$ by using the exchanged key update information, to obtain the new protection key $K'_{UPF}$. As shown in FIG. 4, the method may include the following steps.

Step 401: The UE generates the original key $K_{UPF}$.

The original key $K_{UPF}$ is derived from a permanent key, and the original key $K_{UPF}$ may be generated by a terminal device based on a first group of generation parameters. For example, that the UE generates the original key $K_{UPF}$ may include:

The UE obtains the first group of generation parameters, and generates the original key $K_{UPF}$ based on the first group of generation parameters, where the first group of generation parameters includes the permanent key or a sub-key derived from the permanent key, and the first group of generation parameters is sent by an AMF or an SEAF to the UE.

For example, the UE may obtain, from the AMF (or the SEAF), a parameter used to generate a key $K_{AMF}$ (or $K_{SEAF}$), generate the key $K_{AMF}$ (or $K_{SEAF}$) based on the obtained parameter, and then generate the original key $K_{UPF}$ based on the generated key $K_{AMF}$ (or $K_{SEAF}$) and the parameter that is obtained from the AMF (or the SEAF) and that is used to generate the key $K_{UPF}$.

For a process in which the UE generates the original key $K_{UPF}$ based on the generated key $K_{AMF}$ (or $K_{SEAF}$) and the parameter that is obtained from the AMF (or the SEAF) and that is used to generate the key $K_{UPF}$, refer to the existing technology. For example, the UE may input, into a KDF, the key $K_{AMF}$ (or $K_{SEAF}$) and the parameter that is obtained from the AMF (or the SEAF) and that is used to generate the key $K_{UPF}$, to obtain the original key $K_{UPF}$.

Step 402: The UPF obtains the original key $K_{UPF}$.

The original key $K_{UPF}$ is a key derived from the permanent key or the sub-key of the permanent key.

For example, the UPF may obtain the original key $K_{UPF}$ in the following several manners:

Manner 1: The original key $K_{UPF}$ is a key generated by the AMF based on the key $K_{AMF}$ and another parameter (for example, a random number), and the UPF obtains the original key $K_{UPF}$ from the AMF.

For example, an SMF sends a key generation indication to the AMF, where the key generation indication may be used to indicate the AMF to generate the original key $K_{UPF}$ and send the generated original key $K_{UPF}$ to the UPF. After receiving the key generation indication, the AMF generates the original key $K_{UPF}$ based on the key $K_{AMF}$ and the another parameter, and sends the original key $K_{UPF}$ to the UPF. That the AMF sends the original key $K_{UPF}$ to the UPF may include: The AMF sends the original key $K_{UPF}$ to the SMF, and the SMF sends the original key $K_{UPF}$ to the UPF through an N4 link, or the AMF sends the original key $K_{UPF}$ to a RAN, and the RAN sends the original key $K_{UPF}$ to the UPF through an N3 link.

For a process in which the AMF generates $K_{UPF}$ based on the key $K_{AMF}$ and the another parameter, refer to a process in which an AMF generates an access network key $K_{RAN}$ in the existing technology. For example, the AMF may input the key $K_{AMF}$ and the another parameter into the key generation function (KDF), to obtain $K_{UPF}$. In some embodiments of this application, the another parameter may include but is not limited to a key algorithm, a key type, or the like. The key algorithm may be an existing common key algorithm, for example, an advanced encryption standard (AES) specified by the 3rd generation partnership project (3rd generation partnership project, 3gpp), or an algorithm such as snow3G or Zu Chongzhi (ZUK). The key type is mainly used to distinguish whether a key that needs to be generated by the KDF is an "encryption" key, an "integrity protection" key, a "NAS" key, an "access stratum (AS)" key, or the like.

It should be noted that, after determining to perform security protection on the UPF, the SMF sends the key generation indication to the AMF, or by default, security protection is to be performed on all UPFs managed by the SMF, and the SMF sends the key generation indication to the AMF. A process in which the SMF determines whether to perform security protection on the UPF is described as follows:

Manner 2: The original key $K_{UPF}$ is a key generated by the SEAF based on the key $K_{SEAF}$ and another parameter, and the UPF obtains the original key $K_{UPF}$ from the SEAF.

For a process in which the UPF obtains the original key $K_{UPF}$ from the SEAF, refer to the process in which the UPF obtains the original key $K_{UPF}$ from the AMF in Manner 1. For example, an SMF sends a key generation indication to the SEAF, where the key generation indication may be used to indicate the SEAF to generate the original key $K_{UPF}$ and send the generated original key $K_{UPF}$ to the UPF. After receiving the key generation indication, the SEAF generates the original key $K_{UPF}$ based on the key $K_{SEAF}$ and the another parameter, and sends the original key $K_{UPF}$ to the UPF. That the SEAF sends the original key $K_{UPF}$ to the UPF may include: The SEAF sends the original key $K_{UPF}$ to the SMF, and the SMF sends the original key $K_{UPF}$ to the UPF through an N4 link, or the SEAF sends the original key $K_{UPF}$ to a RAN, and the RAN sends the original key $K_{UPF}$ to the UPF through an N3 link.

When the SEAF and the AMF are separately deployed, the SMF may interact with the SEAF through the AMF. For example, that the SMF sends the key generation indication to the SEAF may include: The SMF sends the key generation indication to the AMF, and the AMF forwards the received key generation indication to the SEAR That the SEAF sends the original key $K_{UPF}$ to the SMF may include: The SEAF sends the original key $K_{UPF}$ to the AMF, and the AMF forwards the received original key $K_{UPF}$ to the SMF.

In addition, for a process in which the SEAF generates $K_{UPF}$ based on the key $K_{SEAF}$ and the another parameter, also refer to a process in which an SEAF generates an access network key $K_{RAN}$ in the existing technology. For example, the SEAF inputs the key $K_{SEAF}$ and the another parameter into the KDF, to obtain $K_{UPF}$.

It should be noted that, after determining to perform security protection on the UPF, the SMF sends the key generation indication to the SEAF, or by default, security protection is to be performed on all UPFs managed by the SMF, and the SMF sends the key generation indication to the SEAR A process in which the SMF determines whether to perform security protection on the UPF is described as follows:

Manner 3: The original key $K_{UPF}$ is a key generated by an SMF based on a key $K_{SMF}$ and another parameter, and the UPF obtains the original key $K_{UPF}$ from the SMF. For example, the SMF may generate the original key $K_{UPF}$ based on the key $K_{SMF}$ and the another parameter, and send the original key $K_{UPF}$ to the UPF through an N4 link.

For a process in which the SMF generates $K_{UPF}$ based on the key $K_{SMF}$ and the another parameter, also refer to a process in which an AMF generates an access network key $K_{RAN}$ in the existing technology. For example, the SMF may input the key $K_{SMF}$ and the another parameter into the KDF, to obtain $K_{UPF}$.

It should be noted that, after determining to perform security protection on the UPF, the SMF generates the original key $K_{UPF}$ based on the key $K_{SMF}$ and the another parameter, or by default, security protection is to be performed on all UPFs managed by the SMF, and the original key $K_{UPF}$ is generated based on the key $K_{SMF}$ and the another parameter.

Manner 4: The original key $K_{UPF}$ is generated by the user plane network function based on a second group of generation parameters, where the second group of generation parameters is sent by the AMF, the SEAF, or an SMF to the UPF. For example, the UPF may obtain the second group of generation parameters from the SMF, and generate the original key $K_{UPF}$ based on the obtained second group of generation parameters.

The second group of generation parameters may include the permanent key or the sub-key derived from the permanent key and another key. For example, the UPF may obtain a key $K_{SMF}$ (or a sub-key of the key $K_{SMF}$) and another parameter from the SMF, and generate the original key $K_{UPF}$ based on the obtained key $K_{SMF}$ (or the obtained sub-key of the key $K_{SMF}$) and the obtained another parameter.

It should be noted that a manner in which the UPF obtains the original key $K_{UPF}$ includes but is not limited to the foregoing four manners. Optionally, the UPF further obtains the original key $K_{UPF}$ from the RAN. For example, the RAN may obtain, from the AMF (or the SEAF), a parameter for generating $K_{UPF}$, generate the original key $K_{UPF}$ based on a key $K_{RAN}$ of the RAN and the obtained parameter, and send the original key $K_{UPF}$ to the UPF. Details are not listed herein.

Step 403: The UE receives first key update information sent by the UPF.

The first key update information may include but is not limited to one or more of a random number, a public key, an Internet protocol (IP) address, a media access control (MAC) address, a port number, a virtual protocol identification number, a key generation function, or key generation function selection information. The random number included in the first key update information may be a value B generated by the UPF. The public key may be a key known to the UE and the UPF. The IP address may be an IP address of the UE and/or an IP address of the UPF. The MAC address may be a MAC address of the UE and/or a MAC address of the UPF. The port number may be a port number on the UE and/or the UPF. The key generation function included in the first key update information may be one or more key generation functions to be selected by the UE. The key generation function selection information may be used to indicate the UE to select an appropriate key generation function. For example, the UE may select, based on the key generation function information, a key generation function from a pre-agreed key generation function or a plurality of key generation functions included in the first key update information, to generate a new protection key $K'_{UPF}$.

The UPF may generate the value B according to the following formula: $B=g^b \bmod p$, where g and p are defined parameters learned by the UE and the UPF in advance; b is a random and confidential number, and b may be generated by the UPF in real time, or may be pre-generated by the UPF or another network function and stored in the UPF; and mod is a "modulo operation". It should be noted that a manner in which the UPF generates the random number B includes but is not limited to the foregoing manner, and may be another method.

In a possible design, that the UE receives the first key update information sent by the UPF includes: The UPF sends the first key update information to the RAN; and the RAN receives the first key update information, and sends the first key update information to the UE.

The first key update information may be included in a first message; and the first message may be a data packet. After receiving the data packet, the RAN sends the data packet to the UE through a data plane. Alternatively, the first message may be control signaling. After receiving the control signaling, the RAN sends the control signaling to the UE through a control plane.

The data plane may be a transmission channel including the N3 link between the RAN and the UPF and a radio bearer (RB) between the RAN and the UE. The control plane is a newly added transmission channel that is between the UPF and the UE and that is used to transmit control signaling. The UE may send control signaling to the UPF or receive control signaling from the UPF through the newly added transmission channel. It should be noted that, during existing implementation, there is no transmission channel used to transmit control signaling between the UPF and the UE.

In at least one embodiment of this application, in addition to carrying the first key update information, the first message may further indicate, in an implicit manner, the UE to update the original key $K_{UPF}$. For example, the following information may be indicated in advance to or preconfigured for the UPF and the UE: the first key update information is carried in an $N^{th}$ message sent by the UPF to the UE, where $N^{th}$ is an integer greater than or equal to 1. When the first message received by the UE is the $N^{th}$ message sent by the UPF, the UE determines to update the original key $K_{UPF}$ and determines that the received first message includes the first key update information, and may update the original key $K_{UPF}$ in a key generation manner described in at least one embodiment of this application. For example, a PDCP layer of a message sent by the UPF includes a PDCP count. Each time the UE receives a message sent by the UPF, the PDCP count is increased by 1. When the PDCP count is N, the UPF determines that the received $N^{th}$ message includes the first key update information, and may update the original key $K_{UPF}$ in the key generation manner described in at least one embodiment of this application.

Alternatively, the first key update information may not be included in the $N^{th}$ message, but is included in another message after the $N^{th}$ message. For example, the information "If the $N^{th}$ message is received, the original key $K_{UPF}$ is updated in the key generation manner described in at least one embodiment of this application" may be indicated in advance to or preconfigured for the UPF and the UE. When the first message received by the UE is the $N^{th}$ message sent by the UPF, the UE determines to update the original key $K_{UPF}$, and may subsequently obtain the first key update information from the another message.

In addition to the foregoing manner, the first message may further indicate, in an explicit manner, the UE to update the original key $K_{UPF}$. For example, the first message further includes a first indication, and the first indication may include predefined information, for example, one or more of a predefined IP address, a predefined MAC address, a predefined port number, or a predefined virtual protocol identification number. When the first message received by the UE includes the predefined information, the UE determines that the received first message includes the first key update information, and may update the original key $K_{UPF}$ in the key generation manner described in at least one embodiment of this application.

For example, an IP address 2 is a predefined source IP address. When a message received by the UE includes the source IP address 2, the UE determines that the message further includes the first key update information, and may update the original key $K_{UPF}$ in the key generation manner described in at least one embodiment of this application.

In another possible design, the UPF sends the first key update information to the SMF; the SMF sends the first key update information to the AMF; and the AMF receives the first key update information, and sends the first key update information to the UE through an N1 link or the RAN.

In another possible design, the first key update information may be included in NAS signaling. The NAS signaling may be NAS signaling that is specially defined and that is used to carry the first key update information, or the NAS signaling is existing NAS signaling. This is not limited.

To improve security of sending the first key update information, in the foregoing possible design, the UPF may send the first key update information after protecting the first key update information. For example, before the UPF sends the first key update information, the UPF protects (performs encryption protection and/or integrity protection on) the first key update information by using the original key $K_{UPF}$ (or a sub-key derived from the original key $K_{UPF}$), to obtain processed first key update information, and sends the processed first key update information to the UE according to any one of the foregoing possible designs. Correspondingly, the UE receives the processed first key update information, and performs a corresponding security-related operation (decryption and/or integrity verification) by using the original key $K_{UPF}$ (or the sub-key derived from the original key $K_{UPF}$), to obtain the first key update information.

In addition, in a process in which the UPF sends the first key update information to the UE, the first key update information processed by the UPF may be reprocessed by another network function and then sent to the UE. For example, the UPF encrypts the first key update information by using $K_{UPF}$. After receiving the encrypted first key update information, the RAN may re-encrypt the encrypted first key update information by using the key $K_{RAN}$ of the RAN. After receiving the re-encrypted message, the UE may decrypt the message by using the key $K_{RAN}$ and the original key $K_{UPF}$, to obtain the first key update information. Alternatively, after receiving the encrypted first key update information, the AMF may re-encrypt the encrypted first key update information by using the key $K_{AMF}$ of the AMF. After receiving the re-encrypted message, the UE may decrypt the message by using the key $K_{AMF}$ and the original key $K_{UPF}$, obtain the key update information.

Step 404: The UPF receives second key update information sent by the UE.

The second key update information may be used to update the original key $K_{UPF}$ obtained by the UPF. Similar to the first key update information, the second key update information may also include but is not limited to one or more of a random number, a public key, an IP address, a MAC address, a port number, a virtual protocol identification number, a key generation function, or key generation function selection information. The random number included in the second key update information may be a value A generated by the UE. The public key, the IP address, the MAC address, the port number, the virtual protocol identification number, the key generation function, and the key generation function selection information are described in step 403, and details are not described again.

In at least one embodiment of this application, the UE may generate the value A in the following manner: $A=g^a$ mod p, where g and p are parameters preconfigured for the UE and the UPF; a is a random and confidential number, and a may be generated by the UE in real time, or may be pre-generated by the UE, another device vendor, or an operator and stored in the UE; and mod is a "modulo operation". It should be noted that a manner in which the UE generates the random number A includes but is not limited to the foregoing manner, and may be another method.

In a possible design, that the UPF receives the second key update information sent by the UE includes: The UE sends the second key update information to the RAN; the RAN receives the second key update information, and sends the second key update information to the UPF; and the UPF receives the second key update information from the RAN.

The second key update information may be included in a second message. The second message may be a data packet. The UE may send the data packet to the RAN through the data plane. After receiving the data packet, the RAN sends the data packet to the UPF through the data plane. Alternatively, the second message may be control signaling. The UE may send, to the RAN through the control plane, the control signaling that includes the second key update information. After receiving the control signaling, the RAN sends the control signaling to the UPF through the control plane.

Related descriptions of the data plane and the control plane are described in step 403, and details are not described again.

In at least one embodiment of this application, in addition to carrying the second key update information, the second message may further indicate, in an implicit manner, the UPF to update the original key $K_{UPF}$. For example, the following information may be indicated in advance to or preconfigured for the UPF and the UE: the second key update information is carried in an $N^{th}$ message sent by the UE to the UPF, where M is an integer greater than or equal to 1. When the second message received by the UPF is the $N^{th}$ message sent by the UE, the UPF determines to update the original key $K_{UPF}$ and determines that the received second message includes the second key update information, and may update the original key $K_{UPF}$ in the key generation manner described in at least one embodiment of this application. For example, a packet data convergence protocol (PDCP) layer of a message exchanged between the UPF and the UE includes a PDCP counter, and the UPF or the UE may determine the $N^{th}$ message based on a value of the PDCP count. The UPF determines that the received $N^{th}$ message includes the second key update information, and may update the original key $K_{UPF}$ in the key generation manner described in at least one embodiment of this application.

Alternatively, the second key update information may not be included in the $N^{th}$ message, but is included in another message after the $N^{th}$ message. For example, the information "If the $N^{th}$ message is received, the original key $K_{UPF}$ is updated in the key generation manner described in at least one embodiment of this application" may be indicated in advance to or preconfigured for the UPF and the UE. When the second message received by the UPF is the $N^{th}$ message sent by the UE, the UPF determines to update the original key $K_{UPF}$, and may subsequently obtain the second key update information from the another message.

In addition to the foregoing manner, the second message may further indicate, in an explicit manner, the UPF to update the original key $K_{UPF}$. For example, the second message further includes a second indication. Similar to the first indication, the second indication may also include predefined information, for example, one or more of a predefined IP address, a predefined MAC address, a predefined port number, or a predefined virtual protocol identification number. When the second message received by the UPF includes the predefined information, the UPF determines to update the original key $K_{UPF}$ and determines that the received second message includes the second key update information, and may update the original key $K_{UPF}$ in the key generation manner described in at least one embodiment of this application.

For example, an IP address 1 is a predefined source IP address. When a message received by the UPF includes the source IP address 1, the UPF determines that the message further includes the second key update information, and may update the original key $K_{UPF}$ in the key generation manner described in at least one embodiment of this application.

It should be noted that the predefined IP address may be the same as or different from the IP address in the second key update information; the predefined MAC address may be the same as or different from the MAC address in the second key update information; and the predefined port number may be the same as or different from the port number in the second key update information. This is not limited.

In another possible design, the UE sends the second key update information to the AMF through a NAS channel (for example, the N1 link). After receiving the second key update information, the AMF sends the second key update information to the SMF, and the SMF sends the second key update information to the UPF.

In another possible design, the second key update information may be included in NAS signaling. The NAS signaling may be NAS signaling that is specially defined and that is used to carry the second key update information, or the NAS signaling is existing NAS signaling. This is not limited.

To improve security of sending the second key update information, in the foregoing possible design, the UE may send the second key update information after protecting the second key update information. For example, before the UE sends the second key update information, the UE protects (performs encryption protection and/or integrity protection on) the second key update information by using the original key $K_{UPF}$ (or a sub-key derived from the original key $K_{UPF}$), to obtain processed second key update information, and sends the processed second key update information to the UPF according to any one of the foregoing possible designs. Correspondingly, the UPF receives the processed second key update information, and performs a corresponding security-related operation (decryption and/or integrity verification) by using the original key $K_{UPF}$ (or the sub-key derived from the original key $K_{UPF}$), to obtain the second key update information.

It should be noted that, in a process of sending the second key update information processed by the UE to the UPF, the second key update information may be reprocessed by the UE and another network function and then sent to the UPF. For example, after the UE encrypts the second key update information by using $K_{UPF}$, the UE re-encrypts the encrypted second key update information by using the key $K_{RAN}$. After receiving the re-encrypted second key update information, the RAN restores the re-encrypted second key update information into the encrypted second key update information (namely, information encrypted by using $K_{UPF}$) by using the key $K_{RAN}$, and sends the encrypted second key update information to the UPF. The UPF decrypts the message by using the original key $K_{UPF}$, to obtain the key update information. Alternatively, the UE re-encrypts the encrypted second key update information by using the key $K_{AMF}$. After receiving the encrypted message, the AMF may decrypt, by using the key $K_{AMF}$ of the AMF, the encrypted message into the encrypted second key update information that is encrypted by using only $K_{UPF}$. After receiving the encrypted second key update information, the UPF may decrypt the message by using the original key $K_{UPF}$, to obtain the key update information. It should be noted that, if the RAN and the AMF cannot obtain $K_{UPF}$, the RAN and the AMF cannot decrypt original key update information.

It should be noted that in at least one embodiments of this application, the second key update information and the second key update information may be the same or may be different. Keys used by the UE and the UPF to encrypt the key update information may also be the same or may be different. This is not limited.

Step 406: The UE generates the new protection key $K'_{UPF}$ based on the original key $K_{UPF}$ and the first key update information.

For example, the UE may input the original key $K_{UPF}$ and a part or all of information in the first key update information into the key generation function, to obtain the new protection key $K'_{UPF}$. For example, the new protection key $K'_{UPF}=KDF(K_{UPF}, A)$, where KDF( ) is any key generation function. For another example, $K'_{UPF}=K_{UPF} \oplus (B^a \bmod p)$. Alternatively, the UE may input a sub-key (a protection key or an integrity protection key) derived from the original key $K_{UPF}$ and a part or all of information in the first key update information into the key generation function, to obtain a new protection key or a new integrity protection key.

Step 405: The UPF generates the new protection key $K'_{UPF}$ based on the original key $K_{UPF}$ and the second key update information.

The new protection key $K'_{UPF}$ may be directly used to perform security protection on user plane data transmitted between the UPF and the UE, or a sub-key derived from the new protection key $K'_{UPF}$ is used to perform security protection on user plane data transmitted between the UPF and the UE.

For example, the UPF may input the original key $K_{UPF}$ and a part or a al of information in the second key update information into the key generation function, to obtain the new protection key $K'_{UPF}$. For example, the new protection key $K'_{UPF}=KDF(K_{UPF}, A)$, where KDF( ) is any key generation function. For another example, $K'_{UPF}=K_{UPF} \oplus (A^b \bmod p)$. Alternatively, the UPF may input a sub-key (a protection key or an integrity protection key) derived from the original key $K_{UPF}$ and a part or all of information in the second key update information into the key generation function, to obtain a new protection key or a new integrity protection key. The new protection key or the new integrity protection key may be referred to as a sub-key of the new protection key $K'_{UPF}$.

According to the method in FIG. 4, the UPF and the UE may exchange the key update information, to update, by using the exchanged key update information, the key derived from the permanent key, to obtain the new protection key, and perform security protection on the user plane data by using the new protection key. In this way, because the new protection key is obtained based on the information exchanged between the UE and the UPF and the key derived from the permanent key, an insider of a network function such as an access network device, an AMF, or an SEAF has no permission to obtain the protection key from the user plane network function or derive the protection key from the permanent key, and consequently, cannot decrypt, based on the protection key, encrypted data that is eavesdropped on. In addition, even if the permanent key is stolen, an attacker cannot derive the new protection key from the permanent key, and cannot decrypt encrypted data that is eavesdropped on over an air interface. In addition, even if the key update information exchanged between the UE and the UPF is tampered with by an intermediary, only a new protection key generated by the UE is inconsistent with a new protection key generated by the UPF. Consequently, the UE and the UPF cannot normally decrypt information sent to each other. An attack from the intermediary can only disrupt interaction between the UE and the UPF, but data transmitted between the UE and the UPF cannot be stolen. Because information cannot be normally sent between the UE and the UPF, behavior of tampering with the key update information exchanged between the UE and the UPF by the intermediary can be quickly discovered, and a corresponding response policy can be executed.

It should be noted that an execution sequence of step 401 to step 406 is not limited in at least one embodiment of this application. In addition to the execution sequence shown in FIG. 4, step 402 may be first performed, and then step 401 is performed; or step 401 and step 402 may be simultaneously performed. Alternatively, step 401, step 403, and step 405 may be performed in sequence, and then step 402, step 404, and step 406 are performed in sequence. In addition, an execution sequence of step 403 and step 404 may not be limited either. An execution sequence of step 405 and step 406 is not limited either.

In a possible design, before step 401 is performed, the method further includes:

The SMF may send a third indication to the UE, where the third indication is used to indicate the UE to update the original key $K_{UPF}$; and the UE receives the third indication sent by the SMF, starts a function of the key generation method described in at least one embodiment of this application, and performs step 401, step 403, and step 405.

The third indication may be named as a key update trigger indication. That the SMF sends the third indication to the UE may include: The SMF includes the third indication in NAS signaling and sends the NAS signaling to the UE. For example, the SMF may include the third indication in an N1 session management container and sends the N1 session management container to the UE, or includes the third indication in a session establishment response (PDU session establishment accept) corresponding to a session establishment request sent by the UE, and sends the session establishment response to the UE.

Similarly, before the UPF performs step 402, the SMF may send a fourth indication to the UPF, to indicate the UPF to update the original key $K_{UPF}$. An example is described as follows:

The SMF sends the fourth indication to the UPF, where the fourth indication is used to indicate the UPF to update the original key $K_{UPF}$; and the UPF receives the first indication sent by the SMF, starts a function of the key generation method described in at least one embodiment of this application, and performs step 402, step 404, and step 406.

The fourth indication may be named as a key update trigger indication. That the SMF sends the fourth indication to the UPF may include: The SMF includes the fourth indication in an N4 session establishment (or modification) request and sends the N4 session establishment (or modification) request to the UPF. Alternatively, the SMF includes the fourth indication in another message, and sends the message to the UPF through the N4 link.

Before the SMF sends the third indication to the UE and sends the fourth indication to the UPF, the SMF may receive the session establishment request sent by the UE. The session establishment request may include information about the UPF, and the session establishment request may be used to request to establish a PDU session with the UPF. The SMF determines, based on the information about the UPF, whether to perform security protection described in this application on the UPF, and if determining to perform security protection on the UPF, sends the fourth indication to the UPF.

The information about the UPF may be used to indicate the UPF, for example, may be the Internet protocol (IP) address of the UPF. That the SMF determines whether to perform security protection on the UPF may include:

The SMF determines, based on a security protection policy, whether to perform security protection on the UPF. The security protection policy may be prestored in the SMF or stored in UDM. The SMF may obtain the security protection policy from the UDM. The security protection policy may include information about a UPF on which security protection is to be performed. If the UPF is included in the security protection policy, it is determined to perform security protection on the UPF; otherwise, it is determined not to perform security protection on the UPF. Alternatively, by default, security protection is performed on all UPFs associated with the SMF (or managed by the SMF) in a communications system. In this case, after receiving the session establishment request, the SMF does not need to determine whether to perform security protection on the UPF, but directly sends the third indication to the UE and the fourth indication to the UPF.

In another possible design, the UPF determines that security protection needs to be performed, and the UPF sends an update indication to the UE, to indicate the UE to update the original key $K_{UPF}$. After receiving the update indication sent by the UPF, the UE starts a function of the key generation method described in at least one embodiment of this application, and performs step 401, step 403, and step 405.

The update indication sent by the UPF to the UE may be the first indication included in the first message in step 403, or may be a piece of information separately sent by the UPF to the UE. This is not limited. In addition, in the possible design, the UPF may have established the PDU session with the UE. The UPF may determine, based on a capability of the UPF or other information, that security protection needs to be performed.

In still another possible design, the UE determines that security protection needs to be performed on the user plane data between the UE and the UPF, and the UE sends an update indication to the UPF, to indicate the UPF to update the original key $K_{UPF}$. After receiving the update indication sent by the UE, the UPF starts a function of the key generation method described in at least one embodiment of this application, and performs step 402, step 404, and step 406. The update indication sent by the UE to the UPF may be the second indication included in the second message in step 404, or may be a piece of information separately sent by the UE to the UPF. This is not limited.

In still another possible design, the UE determines that security protection needs to be performed on the user plane data transmitted between the UE and the UPF, and sends a first request to the UPF, to request to perform security protection on the UPF. After receiving the first request, the UPF determines that security protection is to be performed, and the UPF sends an update indication to the UE, to indicate the UE to update the original key $K_{UPF}$. After receiving the update indication sent by the UPF, the UE starts a function of the key generation method described in at least one embodiment of this application, and performs step 401, step 403, and step 405. Further, after starting the key generation method provided in at least one embodiment of this application, the UPF may send an indication to the UE, to indicate the UE to also start the key generation method provided in at least one embodiment of this application.

It should be noted that the key generation method in FIG. 4 may be performed when a session (for example, a PDU session) is established between the UE and a network. Alternatively, it may not be limited to implementing the key generation method during session establishment. The key generation method is also applicable to the following scenario: A session has been established between the UE and the network (or the UPF), and a corresponding key has been generated by the UE and the network. For example, the UE has generated $K_{UPF}$, and the UPF has generated $K_{UPF}$. In this scenario, step 401 and step 402 do not need to be performed.

The method shown in FIG. 4 is described in detail below by using an example in which the SMF sends, to the UPF and the UE, an indication used to indicate to update the original key $K_{UPF}$.

Figure 5:
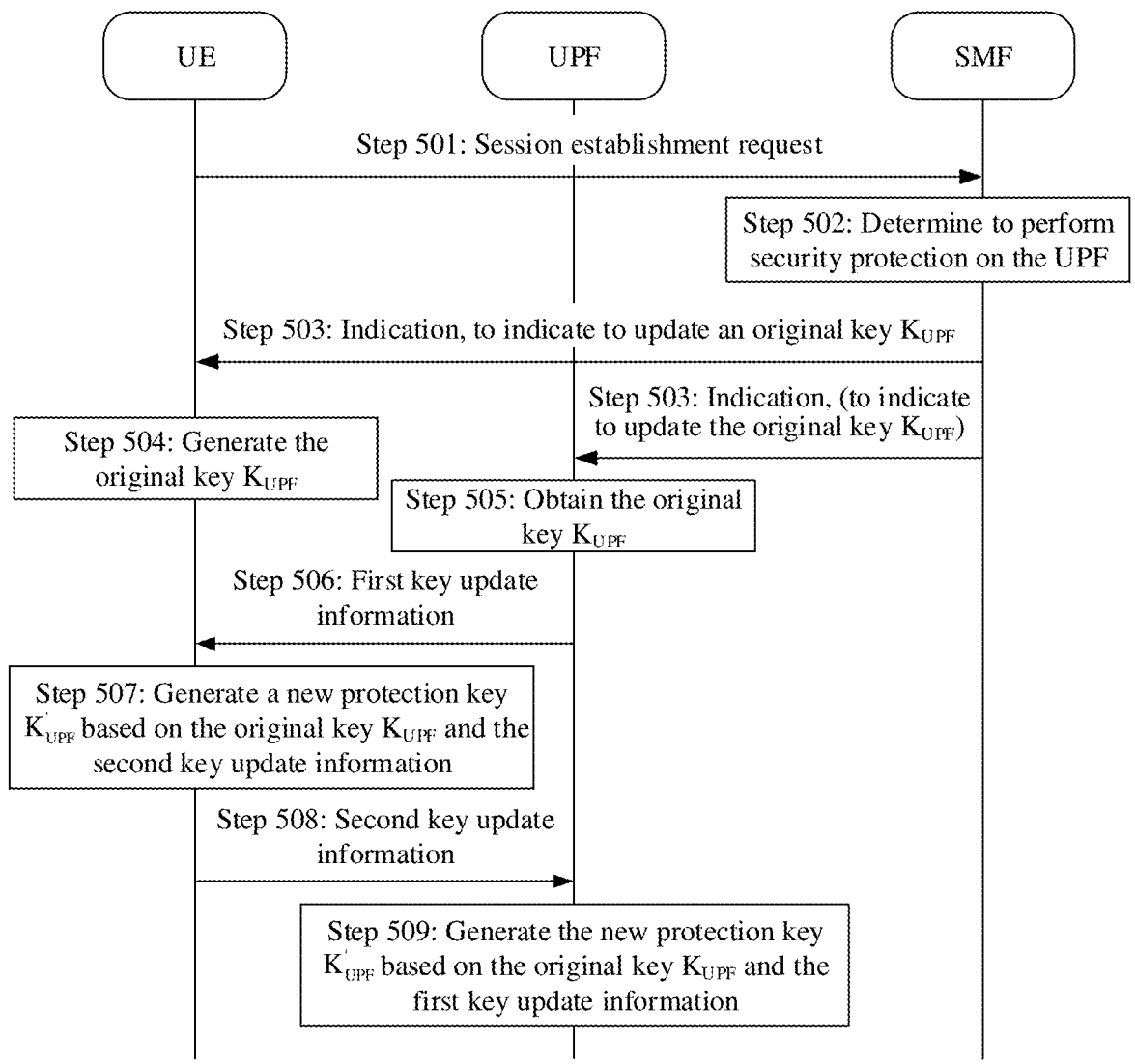
FIG. 5 is a flowchart of another key generation method according to at least one embodiment of this application.

FIG. 5 shows another key generation method according to at least one embodiment of this application. As shown in FIG. 5, the method includes the following steps.

Step 501: UE sends a session establishment request to an SMF, and the SMF receives the session establishment request.

The session establishment request may be used to request to establish a PDU session with a UPF, and the session establishment request may include information about the UPF. The information about the UPF is described above, and details are not described again.

Step 502: The SMF determines to perform security protection on the UPF.

A manner in which the SMF determines to perform security protection on the UPF is described above, and details are not described again.

Step 503: The SMF sends indications to the UE and the UPF, to indicate to update an original key $K_{UPF}$.

The indication sent by the SMF to the UE is the third indication, and the indication sent by the SMF to the UPF is the fourth indication. Details are not described again. It should be noted that the SMF may send the indications to the UE and the UPF at the same time, or may send the indications to the UE and the UPF in sequence. This is not limited.

The SMF may send the indication to the UE through an AMF, and the indication sent by the SMF to the UE may be included in a session establishment response corresponding to the session establishment request.

The SMF may directly send the indication to the UPF through an N4 link.

Step 504: The UE receives the indication sent by the SMF, and generates the original key $K_{UPF}$.

For a manner in which the UE generates the original key $K_{UPF}$, refer to the descriptions of step 401. Details are not described again.

Step 505: The UPF receives the indication sent by the SMF, and obtains the original key $K_{UPF}$.

For a manner in which the UPF obtains the original key $K_{UPF}$, refer to the descriptions of step 402. Details are not described again.

Step 506: The UPF sends first key update information to the UE.

The UPF may send the first key update information to the UE in the manner described in step 403. For example, the UPF may send the first key update information to a RAN, and the RAN sends the first key update information to the UE through a data plane. Alternatively, the UPF sends the first key update information to a RAN, and the RAN sends the first key update information to the UE through a control plane. Alternatively, the UPF sends the first key update information to the AMF, and the AMF sends the first key update information to the UE through a NAS channel.

Step 507: The UE receives the first key update information sent by the UPF, and generates a new protection key $K'_{UPF}$ based on the original key $K_{UPF}$ and the first key update information.

For step 507, refer to the descriptions of step 405. Details are not described again.

Step 508: The UE sends second key update information to the UPF.

Related descriptions of the second key update information are described above, and details are not described again.

The UE may send the second key update information to the UPF in the manner described in step 404. For example, the UE may send the second key update information to the RAN, and the RAN sends the second key update information to the UPF through the data plane. Alternatively, the UE sends the second key update information to the RAN, and the RAN sends the second key update information to the UPF through the control plane. Alternatively, the UE sends the second key update information to the AMF through the NAS channel, and the AMF sends the second key update information to the UPF through the SMF.

Step 509: The UPF receives the second key update information sent by the UE, and generates the new protection key $K'_{UPF}$ based on the original key $K_{UPF}$ and the second key update information.

For step 509, refer to the descriptions of step 406. Details are not described again.

It should be noted that an execution sequence of step 504 to step 509 is not limited in at least one embodiment of this application. In addition to the execution sequence shown in FIG. 5, step 504 may be first performed, and then step 505 is performed; or step 504 and step 505 may be simultaneously performed. Alternatively, step 504, step 506, and step 507 may be performed in sequence, and then step 505, step 508, and step 509 are performed in sequence.

In addition, the key generation method in FIG. 5 is performed when a session (for example, a PDU session) is established between the UE and a network. It should be noted that, this application is not limited to implementing the key generation method during session establishment. The key generation method is also applicable to the following scenario: A session has been established between the UE and the network (or the UPF), and a corresponding key has been generated by the UE and the network. For example, the UE has generated $K_{UPF}$, and the UPF has generated $K_{UPF}$. In this scenario, step 501, step 504, and step 505 do not need to be performed.

According to the method in FIG. 5, in a session establishment process, the SMF indicates the UPF and the UE to update the original key, and the UPF and the UE exchange the key update information as indicated by the SMF, to update, by using the exchanged key update information, a key derived from a permanent key, to obtain a new protection key, and perform security protection on user plane data by using the new protection key. In this way, because the new protection key is obtained based on the information exchanged between the UE and the UPF and the key derived from the permanent key, an insider of a network function such as an access network device, an AMF, or an SEAF has no permission to obtain the protection key from the user plane network function or derive the protection key from the permanent key, and consequently, cannot decrypt, based on the protection key, encrypted data that is eavesdropped on. In addition, even if the permanent key is stolen, an attacker cannot derive the new protection key from the permanent key, and cannot decrypt encrypted data that is eavesdropped on over an air interface. In addition, even if the key update information exchanged between the UE and the UPF is tampered with by an intermediary, only a new protection key generated by the UE is inconsistent with a new protection key generated by the UPF. Consequently, the UE and the UPF cannot normally decrypt information sent to each other. An attack from the intermediary can only disrupt interaction between the UE and the UPF, but data transmitted between the UE and the UPF cannot be stolen. Because information cannot be normally sent between the UE and the UPF, behavior of tampering with the key update information exchanged between the UE and the UPF by the intermediary can be quickly discovered, and a corresponding response policy can be executed.

In another feasible method, a key update may be first performed on a control plane key (for example, a key $K_{SMF}$ of the SMF), and a key used to perform security protection on the user plane data is derived from an updated control plane key and then delivered to the UPF. Specifically, the method is shown in FIG. 6.

Figure 6:
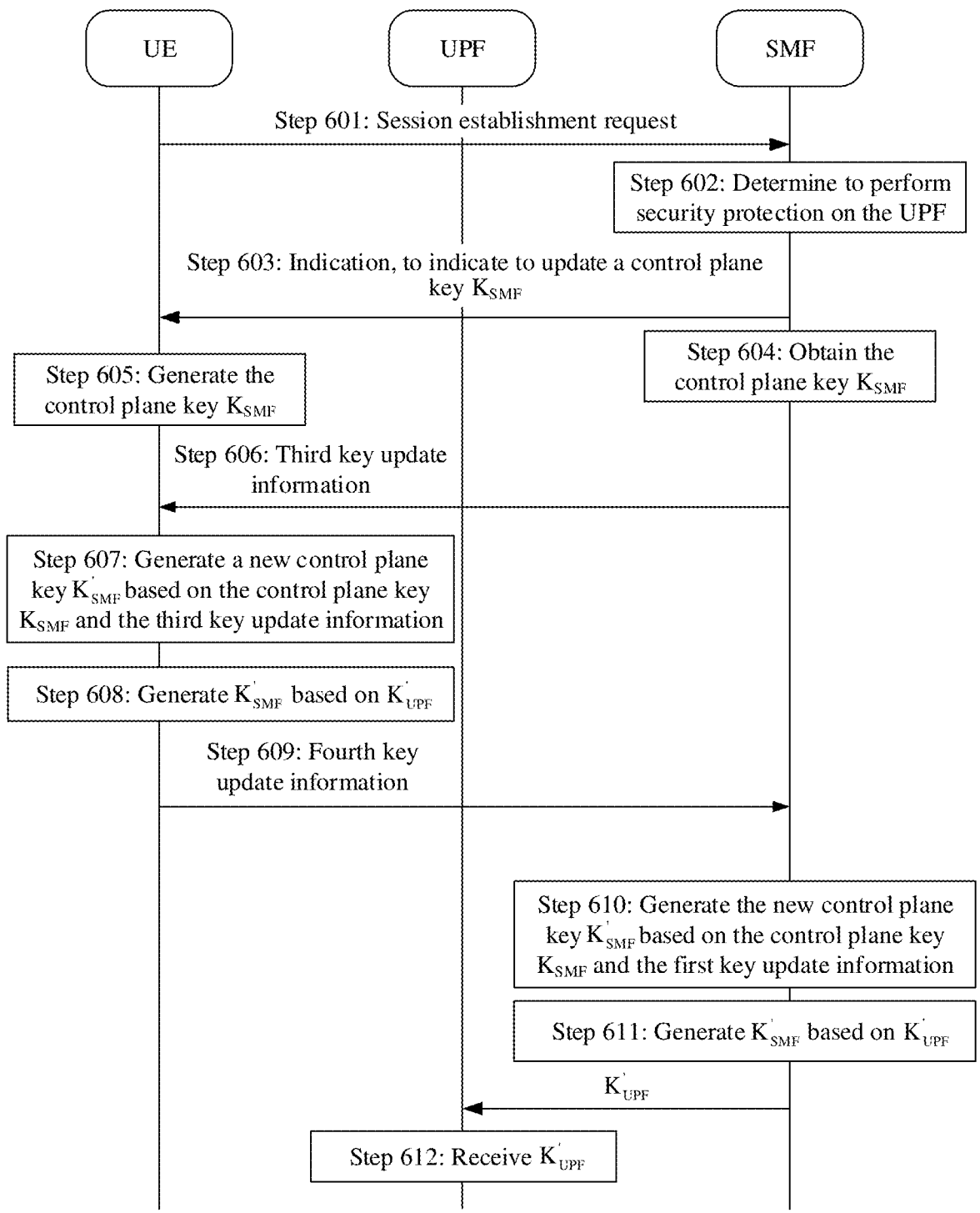
FIG. 6 is a flowchart of still another key generation method according to at least one embodiment of this application.

FIG. 6 shows still another key generation method according to at least one embodiment of this application. As shown in FIG. 6, the method includes the following steps.

Step 601: UE sends a session establishment request to an SMF, and the SMF receives the session establishment request.

The session establishment request may be used to request to establish a PDU session with a UPF, and the session establishment request may include information about the UPF. The information about the UPF is described above, and details are not described again.

Step 602: The SMF determines to perform security protection on the UPF.

A manner in which the SMF determines to perform security protection on the UPF is described above, and details are not described again.

Step 603: The SMF sends an indication to the UE, to indicate to update a control plane key $K_{SMF}$.

The control plane key $K_{SMF}$ is derived from a permanent key or a sub-key derived from the permanent key.

The SMF may send the indication to the UE through an AMF.

Step 604: The SMF obtains the control plane key $K_{SMF}$.

The control plane key $K_{SMF}$ is generated by the AMF or an SEAF, and the SMF may obtain the control plane key $K_{SMF}$ from the AMF or the SEAF. For a manner in which the AMF or the SEAF generates the control plane key $K_{SMF}$, refer to a manner in which an AMF or an SEAF generates a key $K_{AMF}$ in the existing technology, and details are not described again.

Step 605: The UE receives the indication sent by the SMF, and generates the control plane key $K_{SMF}$.

A manner in which the UE generates the control plane key $K_{SMF}$ is the same as a manner in which the UE generates an original key $K_{UPF}$, and details are not described again.

Step 606: The SMF sends third key update information to the UE.

The third key update information may be used to update the control plane key $K_{SMF}$. The third key update information may include but is not limited to one or more of a random number, a public key, an IP address, a MAC address, a port number, a virtual protocol identification number, or key generation function selection information. The random number may be a value C generated by the SMF, and the public key, the IP address, the MAC address, the port number, the virtual protocol identification number, and the key generation function selection information are described in step 403, and details are not described again.

The SMF may generate the value C in the following manner: $C=g^c \mod p$, where g and p are parameters preconfigured for the UE and the SMF; c is a random and confidential number, and c may be generated by the SMF in real time, or may be pre-generated by the SMF or another network function and stored in the UE; and mod is a "modulo operation". It should be noted that a manner in which the SMF generates the random number C includes but is not limited to the foregoing manner, and may be another method.

For example, the SMF may send the third key update information to the AMF, the AMF sends the third key update information to a RAN, and the RAN sends the third key update information to the UE. Alternatively, the SMF may send the third key update information to the AMF, and the AMF sends the key update information to the UE.

Step 607: The UE receives the third key update information sent by the SMF, and generates a new control plane key $K'_{SMF}$ based on the control plane key $K_{SMF}$ and the third key update information.

For a manner in which the UE generates new $K_{SMF}$ based on the control plane key $K_{SMF}$ and the third key update information, refer to the foregoing process in which the UE generates the new protection key based on the original key $K_{UPF}$ and the third key update information. For example, the UE may input the control plane key $K_{SMF}$ and a part or all of information in the third key update information into a key generation function, to obtain the new control plane key $K'_{SMF}$. For example, the new control plane key $K'_{SMF}$=KDF ($K_{SMF}$, C), where KDF( ) is any key generation function. For another example, $K'_{SMF}=K_{SMF} \oplus (C^a \mod p)$.

To improve security of sending the third key update information, the SMF may send the third key update information after protecting the third key update information. For example, before the SMF sends the third key update information, the SMF protects (performs encryption protection and/or integrity protection on) the third key update information by using the control plane key $K_{SMF}$ (or a sub-key derived from the control plane key $K_{SMF}$), to obtain processed third key update information, and sends the processed third key update information to the UE. Correspondingly, the UE receives the processed third key update information, and performs a corresponding security-related operation (decryption and/or integrity verification) by using the control plane key $K_{SMF}$ (or the sub-key derived from the control plane key $K_{SMF}$), to obtain the third key update information.

Step 608: The UE generates $K'_{UPF}$ based on $K'_{SMF}$.

$K'_{UPF}$ generated by the UE is used to perform security protection on user plane data transmitted between the UPF and the UE.

For example, the UE inputs $K'_{SMF}$ and another parameter into the KDF, to obtain $K'_{UPF}$.

Further, the UE may further generate a sub-key (an encryption key or an integrity protection key) of $K'_{UPF}$ based on $K'_{UPF}$.

Step 609: The UE sends fourth key update information to the SMF.

The fourth key update information may be used to update the control plane key $K_{SMF}$. Content included in the fourth key update information is the same as content included in the second key update information in step 404, and details are not described again.

For example, the UE may send the fourth key update information to the RAN; after receiving the fourth key update information, the RAN sends the fourth key update information to the AMF; and the AMF sends the fourth key update information to the SMF. Alternatively, the UE directly sends the fourth key update information to the AMF, and the AMF sends the fourth key update information to the SMF.

Step 610: The SMF receives the fourth key update information sent by the UE, and generates the new control plane key $K'_{SMF}$ based on the control plane key $K_{SMF}$ and the fourth key update information.

For a manner in which the SMF generates the new control plane key $K_{SMF}$ based on the control plane key $K_{SMF}$ and the fourth key update information, refer to the foregoing process in which the UPF generates the new protection key $K'_{UPF}$ based on the original key $K_{UPF}$ and the fourth key update information. For example, the SMF may input the control plane key $K_{SMF}$ and a part or all of information in the fourth key update information into the key generation function, to obtain the new control plane key $K'_{SMF}$. For example, the new control plane key $K'_{SMF}=KDF(K_{SMF}, A)$, where KDF( ) is any key generation function. For another example, $K'_{SMF}=K_{SMF}\oplus(A^b \mod p)$.

To improve security of sending the fourth key update information, the UE may send the fourth key update information after protecting the fourth key update information. For example, before the UE sends the first key update information, the UE protects (performs encryption protection and/or integrity protection on) the fourth key update information by using the control plane key $K_{SMF}$ (or a sub-key derived from the control plane key $K_{SMF}$), to obtain processed fourth key update information, and sends the processed fourth key update information to the SMF. Correspondingly, the SMF receives the processed fourth key update information, and performs a corresponding security-related operation (decryption and/or integrity verification) by using the control plane key $K_{SMF}$ (or the sub-key derived from the control plane key $K_{SMF}$), to obtain the fourth key update information.

Step 611: The SMF generates $K'_{UPF}$ based on $K'_{SMF}$ and sends $K'_{UPF}$ to the UPF.

$K'_{UPF}$ sent by the SMF to the UPF is used to perform security protection on the user plane data transmitted between the UPF and the UE. That the SMF generates $K'_{UPF}$ based on $K'_{SMF}$ may include: The SMF inputs K SMF and another parameter into the KDF, to obtain $K'_{UPF}$.

It should be noted that, the SMF may generate a sub-key (for example, an encryption key or an integrity protection key) of $K'_{UPF}$ based on $K'_{SMF}$, and sends the sub-key of $K'_{UPF}$ to the UPF. In at least one embodiments of this application, the encryption key may be used to perform encryption protection on data, and the integrity protection key may be used to perform integrity protection on the data.

Step 612: The UPF receives the new protection key $K'_{UPF}$ sent by the SMF.

Subsequently, the UPF may perform security protection on the user plane data by using the new protection key $K'_{UPF}$ or the sub-key derived from the new protection key $K'_{UPF}$.

It should be noted that an execution sequence of step 603 to step 612 is not limited in at least one embodiment of this application. In addition to the execution sequence shown in FIG. 6, step 604 may be first performed, and then step 603 is performed; or step 603 and step 604 may be simultaneously performed. Alternatively, step 610 to step 612 may be performed in sequence, and then step 606 to step 609 are performed in sequence. This is not limited.

Further, the key generation method in FIG. 6 is performed when a session (for example, a PDU session) is established between the UE and a network. It should be noted that, this application is not limited to implementing the key generation method during session establishment. The key generation method is also applicable to the following scenario: A session has been established between the UE and the network (or the SMF), and a corresponding key has been generated by the UE and the SMF. For example, the UE has generated $K_{SMF}$, and the SMF has generated $K_{SMF}$. In this scenario, step 601, step 604, and step 605 do not need to be performed.

In addition, at least one embodiment of this application includes but is not limited to: updating the control plane key $K_{SMF}$, and generating, based on updated $K'_{SMF}$, the key $K'_{UPF}$ used to perform security protection on the user plane data. Further, another control plane key, for example, a key $K_{AMF}$ of the AMF may be updated, and the key $K'_{UPF}$ used to perform security protection on the user plane data is generated based on updated $K'_{AMF}$, or $K'_{SMF}$ is first derived from updated $K'_{AMF}$, and then $K'_{UPF}$ is generated based on $K'_{SMF}$.

According to the method in FIG. 6, the SMF may first update the key $K_{SMF}$ of the SMF, and then derive, from an updated key $K_{SMF}$, the key $K_{UPF}$ used to perform security protection on the user plane data. In other words, the key $K_{UPF}$ used to perform security protection on the user plane data is generated through derivation from updated $K_{SMF}$, and is sent by the SMF to the UPF. Because the key $K_{UPF}$ used to perform security protection on the user plane data is obtained based on the information exchanged between the UE and the SMF and the key derived from the permanent key, an insider of a network function such as an access network device, an AMF, or an SEAF has no permission to obtain the protection key or cannot derive the protection key from the permanent key, and consequently, cannot decrypt, based on the protection key, encrypted data that is eavesdropped on. In addition, if the permanent key is stolen, an attacker cannot derive the protection key from the permanent key, and cannot decrypt encrypted data that is eavesdropped on over an air interface. In addition, even if the key update information exchanged between the UE and the SMF is tampered with by an intermediary, only a key derived by the UE from updated $K_{SMF}$ is inconsistent with a key derived by the SMF from updated $K_{SMF}$. Consequently, the UE and the UPF cannot normally decrypt information sent to each other. An attack from the intermediary can only disrupt interaction between the UE and the UPF, but data transmitted between the UE and the UPF cannot be stolen. Because information cannot be normally sent between the UE and the UPF, destroying behavior of tampering with the key update information exchanged between the UE and the SMF by the intermediary can be quickly discovered, and a corresponding response policy can be executed.

The foregoing mainly describes the solutions provided in this application from the perspective of interaction between nodes. It may be understood that to implement the foregoing functions, the nodes such as the user plane network function, the session management network function, and the terminal device each include a corresponding hardware structure and/or software module for implementing each function. A person of ordinary skill in the art should easily be aware that, in combination with the examples described in the algorithm steps of at least one embodiments disclosed in this specification, one or more embodiments can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the disclosure of the instant application.

In this application, functional modules in the user plane network function, the session management network function, and the terminal device may be obtained through division based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that in this application, division into the modules is an example and is merely logical function division, and may be other division during actual implementation.

Figure 7:
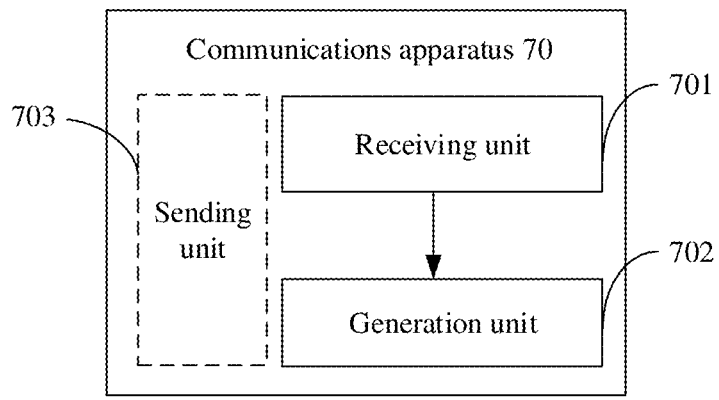
FIG. 7 is a schematic composition diagram of a communications apparatus 70 according to at least one embodiment of this application.

FIG. 7 is a schematic composition diagram of a communications apparatus 70 according to at least one embodiment of this application. The communications apparatus 70 may be a terminal device or a chip or a system-on-a-chip in a terminal device. As shown in FIG. 7, the communications apparatus 70 may include a receiving unit 701 and a generation unit 702.

The receiving unit 701 is configured to receive first key update information sent by a user plane network function. For example, the receiving unit 701 may be configured to support the communications apparatus 70 in performing step 403 and step 507.

The generation unit 702 is configured to generate a second key based on a first key and the first key update information. The second key is used to perform security protection on data transmitted between the user plane network function and the terminal device; the first key is the same as a third key obtained by the terminal device; and the first key and the third key are derived from a permanent key. For example, the generation unit 702 may be configured to support the communications apparatus 70 in performing step 405 and step 507.

Further, as shown in FIG. 7, the communications apparatus 70 may further include a sending unit 703.

The sending unit 703 is configured to send second key update information to the user plane network function. For example, the sending unit 703 supports the communications apparatus 70 in performing step 404 and step 508.

It should be noted that all related content of the steps in the foregoing method embodiments may be cited in function descriptions of corresponding functional modules. Details are not described again herein. The communications apparatus 70 provided in at least one embodiment of this application is configured to perform functions of the terminal device in the key generation methods shown in FIG. 4 to FIG. 6. Therefore, effects the same as those of the foregoing key generation methods can be achieved.

In another possible implementation, the communications apparatus 70 shown in FIG. 7 may include a processing module and a communications module. The processing module may integrate a function of the generation unit 702, and the communications module may integrate functions of the receiving unit 701 and the sending unit 703. The processing module is configured to control and manage an action of the communications apparatus 70. For example, the processing module is configured to support the communications apparatus 70 in performing step 405, step 507, and another process of the technology described in this specification. The communications module is configured to support the communications apparatus 70 in performing step 403, step 507, step 404, step 508, and communication with another network entity. Further, the communications apparatus 70 shown in FIG. 7 may further include a storage module, configured to store program code and data of the communications apparatus 70.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus 70 shown in FIG. 7 may be the communications apparatus shown in FIG. 2.

Figure 8:
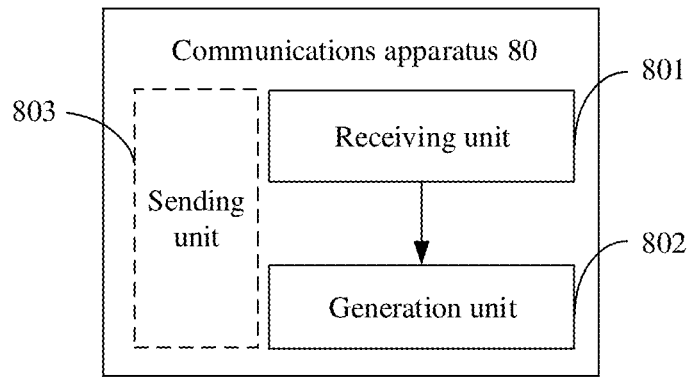
FIG. 8 is a schematic composition diagram of a communications apparatus 80 according to at least one embodiment of this application.

FIG. 8 is a schematic composition diagram of a communications apparatus 80 according to at least one embodiment of this application. The communications apparatus 80 may be a user plane network function or a chip or a system-on-a-chip in a user plane network function. As shown in FIG. 8, the communications apparatus 80 may include a receiving unit 801 and a generation unit 802.

The receiving unit 801 is configured to receive second key update information sent by a terminal device. For example, the receiving unit 801 is configured to support the communications apparatus 80 in performing step 404 and step 508.

The generation unit 802 is configured to generate a fourth key based on a third key and the second key update information. The fourth key is used to perform security protection on data transmitted between a user plane network function and the terminal device; the third key is the same as a first key generated by the terminal device; and the first key and the third key are derived from a permanent key. For example, the generation unit 802 is configured to support the communications apparatus 80 in performing step 406 and step 509.

Further, as shown in FIG. 8, the communications apparatus 80 may further include a sending unit 803.

The sending unit 803 is configured to send first key update information to the terminal device. For example, the sending unit 803 supports the communications apparatus 80 in performing step 403 and step 506.

It should be noted that all related content of the steps in the foregoing method embodiments may be cited in function descriptions of corresponding functional modules. Details are not described again herein. The communications apparatus 80 provided in at least one embodiment of this application is configured to perform functions of the user plane network function in the key generation methods shown in FIG. 4 to FIG. 6. Therefore, effects the same as those of the foregoing key generation methods can be achieved.

In another possible implementation, the communications apparatus 80 shown in FIG. 8 may include a processing module and a communications module. The processing module may integrate a function of the generation unit 802, and the communications module may integrate functions of the receiving unit 801 and the sending unit 803. The processing module is configured to control and manage an action of the communications apparatus 80. For example, the processing module is configured to support the communications apparatus 80 in performing step 406, step 509, and another process of the technology described in this specification. The communications module is configured to support the communications apparatus 80 in performing step 404, step 508, step 403, step 506, and communication with another network entity. Further, the communications apparatus 80 shown in FIG. 8 may further include a storage module, configured to store program code and data of the communications apparatus 80.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus 80 shown in FIG. 8 may be the communications apparatus shown in FIG. 2.

Figure 9:
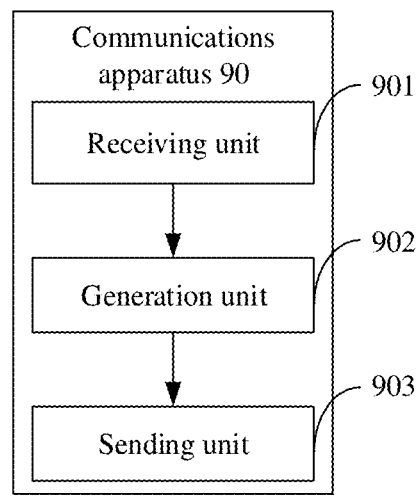
FIG. 9 is a schematic composition diagram of a communications apparatus 90 according to at least one embodiment of this application.

FIG. 9 is a schematic composition diagram of a communications apparatus 90 according to at least one embodiment of this application. The communications apparatus 90 may be a session management network function or a chip or a system-on-a-chip in a session management network function. As shown in FIG. 9, the communications apparatus 90 may include a receiving unit 901, a generation unit 902, and a sending unit 903.

The receiving unit 901 is configured to receive fourth key update information sent by a terminal device. For example, the receiving unit 901 is configured to support the communications apparatus 90 in performing step 609.

The generation unit 902 is configured to: generate a new control plane key based on a control plane key and the fourth key update information, and derive a new protection key from the new control plane key. For example, the generation unit 902 is configured to support the communications apparatus 90 in performing step 610 and step 611.

The sending unit 903 is configured to send a new protection key to a user plane network function. The new protection key is used to perform security protection on data transmitted between the user plane network function and the terminal device, and the control plane key is derived from a permanent key.

It should be noted that all related content of the steps in the foregoing method embodiments may be cited in function descriptions of corresponding functional modules. Details are not described again herein. The communications apparatus 90 provided in at least one embodiment of this application is configured to perform functions of the session management network function in the key generation method in FIG. 6. Therefore, effects the same as those of the foregoing key generation method can be achieved.

In another possible implementation, the communications apparatus 90 shown in FIG. 9 may include a processing module and a communications module. The processing module may integrate a function of the sending unit 902, and the communications module may integrate functions of the receiving unit 901 and the sending unit 903. The processing module is configured to control and manage an action of the communications apparatus 90. For example, the processing module is configured to support the communications apparatus 90 in performing step 610, step 611, and another process of the technology described in this specification. The communications module is configured to support the communications apparatus 90 in performing step 609 and communication with another network entity. Further, the communications apparatus 90 shown in FIG. 9 may further include a storage module, configured to store program code and data of the communications apparatus 90.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus 90 shown in FIG. 9 may be the communications apparatus shown in FIG. 2.

The foregoing descriptions about implementations allow a person skilled in the art to clearly understand that, for the purpose of convenient and brief description, only division into the foregoing functional modules is used as an example for description. During actual application, the foregoing functions can be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or the units is merely logical function division. There may be another division manner during actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or the communication connections between the apparatuses or units may be implemented in an electronic form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve the objectives of the solutions in at least one embodiments.

In addition, functional units in at least one embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in this application, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in at least one embodiments. The storage medium includes any medium that can store program code, for example, a USB flash drive, a removable hard disk, a ROM, a RAM, a magnetic disk, or an optical disc.

The foregoing descriptions are merely specific implementations of some embodiments, but are not intended to limit the protection scope of the instant application. Any variation or replacement within the technical scope disclosed in the instant application shall fall within the protection scope of the instant application. Therefore, the protection scope of the instant application shall be subject to the protection scope of the claims.

What is claimed is:

1. A key generation method, wherein the method comprises, after a session has been established between a terminal device and a communications apparatus implementing a user plane network function, a first key has been generated for the terminal device and a corresponding third key has been generated for the communications apparatus implementing the user plane network function:
   receiving, by the terminal device, first key update information from the communications apparatus implementing the user plane network function;
   generating, by the terminal device, a second key based on the first key and the first key update information; and
   using, by the terminal device, the second key to perform security protection on data transmitted between the communications apparatus implementing the user plane network function and the terminal device, wherein
   the first key is the same as the third key; and
   the first key and the third key are derived from a permanent key.

2. The method according to claim 1, wherein the method further comprises:
   receiving, by the terminal device, a first group of generation parameters from a further communications apparatus implementing a mobility management network function or a security anchor function network function; and
   generating, by the terminal device, the first key, based on the first group of generation parameters, wherein the first group of generation parameters comprises the permanent key or a sub-key derived from the permanent key.

3. The method according to claim 1, wherein the method further comprises:
   receiving, by the terminal device, a first indication from the communications apparatus implementing the user plane network function, wherein
   the first indication indicates the terminal device to update the first key, and
   in response to the first indication, said generating the second key is performed by the terminal device; or
   sending, by the terminal device, a second indication to the communications apparatus implementing the user plane network function, wherein the second indication indicates the communications apparatus implementing the user plane network function to update the third key.

4. The method according to claim 3, wherein
   the first indication or the second indication comprises at least one of: a predefined Internet protocol (IP) address, a predefined port number, or a predefined virtual protocol identifier (ID); or
   the first indication is an $N^{th}$ message from the communications apparatus implementing the user plane network function to the terminal device, or the second indication is an $N^{th}$ message from the terminal device to the communications apparatus implementing the user plane network function, wherein N is an integer greater than or equal to 1.

5. A key generation method, wherein the method comprises:
   receiving, by a communications apparatus implementing a user plane network function, second key update information from a terminal device;
   generating, by the communications apparatus implementing the user plane network function, a fourth key based on a third key and the second key update information; and
   using the fourth key to perform security protection on data transmitted between the communications apparatus implementing the user plane network function and the terminal device, wherein
   the third key is the same as a first key generated by the terminal device; and
   the first key and the third key are derived from a permanent key.

6. The method according to claim 5, wherein the method further comprises:
   receiving, by the communications apparatus implementing the user plane network function, the third key from a further communications apparatus implementing a mobility management network function, a security anchor network function, or a session management network function.

7. The method according to claim 5, wherein the method further comprises:
   sending, by the communications apparatus implementing the user plane network function, a first indication to the terminal device, wherein the first indication indicates the terminal device to update the first key; or
   receiving, by the communications apparatus implementing the user plane network function, a second indication from the terminal device, wherein the second indication indicates the communications apparatus implementing the user plane network function to update the third key.

8. The method according to claim 7, wherein
   the first indication or the second indication comprises at least one of: a key update indicator, a predefined Internet protocol (IP) address, a predefined port number, or a predefined virtual protocol identifier (ID); or the first indication is an $N^{th}$ message from the communications apparatus implementing the user plane network function to the terminal device, or the second indication is an $N^{th}$ message from the terminal device to the communications apparatus implementing the user plane network function, wherein N is an integer greater than or equal to 1.

9. The method according to claim 5, wherein the method comprises:

sending, by the communications apparatus implementing the user plane network function, first key update information to the terminal device, wherein the first key update information is used to update the first key generated by the terminal device, to obtain a second key;

the second key is used to perform security protection on the data transmitted between the communications apparatus implementing the user plane network function and the terminal device; and the second key is the same as the fourth key.

10. The method according to claim 9, wherein the second key update information or the first key update information comprises at least one of: a random number, a public key, an Internet protocol (IP) address, a media access control (MAC) address, a port number, a virtual protocol identification number, a key generation function, or key generation function selection information.

11. The method according to claim 5, wherein the method further comprises:

receiving, by the communications apparatus implementing the user plane network function, a second group of generation parameters from a further communications apparatus implementing a mobility management network function, a security anchor function network function, or a session management network function; and generating, by the communications apparatus implementing the user plane network function, the third key, based on the second group of generation parameters, wherein the second group of generation parameters comprises the permanent key or a sub-key derived from the permanent key.

12. A terminal device, wherein the terminal device comprises:

a transceiver circuit configured to receive third key update information from a first communications apparatus implementing a session management function; and a processor configured to generate a new control plane key based on a control plane key and the third key update information, generate a second key based on the new control plane key, cause the transceiver circuit to send fourth key update information to the first communications apparatus implementing the session management function, wherein the first communications apparatus implementing the session management function is configured to:

generate the new control plane key based on the control plane key and the fourth key update information, generate the second key based on the new control plane key, and send the second key to a second communications apparatus implementing a user plane network function, and using the second key, perform security protection on data transmitted between the second communications apparatus implementing the user plane network function and the terminal device, wherein the control plane key is derived from a permanent key.

13. The terminal device according to claim 12, wherein the processor is further configured to generate the control plane key based on a first group of generation parameters, the first group of generation parameters comprises the permanent key or a sub-key derived from the permanent key, and the transceiver circuit is configured to receive the first group of generation parameters from a third communications apparatus implementing a mobility management network function or a security anchor function network function.

14. The terminal device according to claim 12, wherein the transceiver circuit is further configured to receive an indication from the first communications apparatus implementing the session management function, wherein the indication indicates the terminal device to update the control plane key.

15. A communications apparatus configured to implement a user plane network function, wherein the communications apparatus comprises:

a transceiver circuit configured to receive second key update information from a terminal device; and a processor configured to generate a fourth key based on a third key and the second key update information, and using the fourth key, perform security protection on data transmitted between the communications apparatus and the terminal device, wherein the third key is the same as a first key generated by the terminal device; and the first key and the third key are derived from a permanent key.

16. The communications apparatus according to claim 15, wherein the transceiver circuit is further configured to receive the third key from a further communications apparatus implementing a mobility management network function, a security anchor network function, or a session management network function; or the processor is further configured to generate the third key based on a second group of generation parameters, wherein the second group of generation parameters comprises the permanent key or a sub-key derived from the permanent key, and the transceiver circuit is further configured to receive the second group of generation parameters from a further communications apparatus implementing a mobility management network function, a security anchor function network function, or a session management network function.

17. The communications apparatus according to claim 15, wherein the transceiver circuit is further configured to send a first indication to the terminal device, wherein the first indication indicates the terminal device to update the first key; or the transceiver circuit is further configured to receive a second indication sent by from the terminal device, wherein the second indication indicates the communications apparatus to update the third key.

18. The communications apparatus according to claim 17, wherein the first indication or the second indication comprises at least one of: a predefined Internet protocol (IP) address, a predefined port number, or a predefined virtual protocol identifier (ID); or the first indication is an $N^{th}$ message from the communications apparatus to the terminal device, or the second indication is an $N^{th}$ message from the terminal device to the communications apparatus, wherein N is an integer greater than or equal to 1.

19. The communications apparatus according to claim 15, wherein the transceiver circuit is further configured to send first key update information to the terminal device, wherein the first key update information is used to update the first key generated by the terminal device, to obtain a second key;

the second key is used to perform security protection on the data transmitted between the communications apparatus and the terminal device; and the second key is the same as the fourth key.

20. The communications apparatus according to claim 19, wherein the first key update information or the second key update information comprises at least one of: a random number, an Internet protocol (IP) address, a media access control (MAC) address, a port number, or a virtual protocol identification number.

* * * * *